United States Patent [19]
Ito et al.

[11] Patent Number: 5,539,747
[45] Date of Patent: Jul. 23, 1996

[54] FLOW CONTROL METHOD

[75] Inventors: Yukiko Ito, Katano; Tsutomu Tanaka, Nishinomiya; Hiroshi Yokota, Osaka; Tatsuro Ikoma, Moriguchi; Chishio Ueno, Ikoma; Kouji Kubota, Osaka, all of Japan

[73] Assignee: Matsushita Electric Industrial Co., Ltd., Osaka, Japan

[21] Appl. No.: 293,586

[22] Filed: Aug. 22, 1994

[30] Foreign Application Priority Data

Aug. 24, 1993 [JP] Japan .................................. 5-209342

[51] Int. Cl.⁶ .................................................. H04L 12/56
[52] U.S. Cl. .................................................. 370/94.2; 370/60
[58] Field of Search .................... 370/60, 60.1, 94.1, 370/94.2, 85.6, 61, 94.3; 340/825.5, 825.05, 825.51, 825.52, 825.02; 395/849, 854, 860, 864, 877

[56] References Cited

U.S. PATENT DOCUMENTS 4,955,016  9/1990  Eng et al. .................................. 370/60

FOREIGN PATENT DOCUMENTS 4291851  10/1992  Japan .

OTHER PUBLICATIONS

Evaluation of GFC Protocol at the ATM-UNI, 1992 (with Partial Translation), pp. 1–7, Morita et al.

*Primary Examiner*—Douglas W. Olms
*Assistant Examiner*—Dang Ton
*Attorney, Agent, or Firm*—Price, Gess & Ubell

[57] ABSTRACT

A flow control device constructed at a switch device for connecting a plurality of ring networks for exchanging data of a cell among the ring networks. A user device for transmitting a cell carrying data is connected to each ring network, and it can transmit cells within a window counter number. Such flow control device comprises a buffer monitoring unit for monitoring the number of data in an output buffer, a regulation judging unit for comparing the number of data in each buffer with a first threshold value representing state of the buffer which is in danger of overflow, with a second threshold value representing state of the buffer which is not in danger of overflow, and outputting a regulation notice when the data number is grater than the first threshold value while outputting a regulation notice when the data number is smaller than the second threshold value, and a plurality of traffic controlling units for transmitting to the respective ring network a reset cell at a first interval when no regulation notice is received or the release notice is received while transmitting a reset cell at a second interval which is longer than the first interval when the regulation notice is received.

47 Claims, 29 Drawing Sheets

Fig. 4 transition by header converting unit 303

| input cell state | output cell state |
|---|---|
| available | available |
| occupied; destined for another device | occupied available |
| reset judge bit T = ON | T = ON (N = 0 or C = 0)<br>T = OFF (N>0 and C>0) |
| reset judge bit T = OFF | T = OFF |

Fig. 5 transition by cell transmission judging unit 304

| input cell state | internal state upon input | output cell state | internal state upon output |
|---|---|---|---|
| available | N>0,C>0<br>N=0, —<br>— ,C=0 | occupied<br>available<br>available | N=N-1,C=C-1 |
| occupied | | occupied | |
| reset bit=ON | | | C=Cwindow |

Fig. 7 transition by cell header converting unit 402

| input cell state | | internal state upon input | output cell state | internal state upon output |
|---|---|---|---|---|
| available | | | available | |
| occupied | for itself | | occupied | |
| | for another | | available | |
| reset judging bit T=ON | | hunt state or regulation state | reset bit = OFF reset judging bit=ON | |
| | | neither hunt state nor regulation state | reset bit = ON reset judging bit=ON | hunt state timer restart |
| reset judging bit T=OFF | | | reset judging bit=ON | |
| reset bit=ON | | | reset bit = OFF | release hunt state |
| reset bit=OFF | | reset cell transmission direction | reset bit = ON | hunt state timer restart |
| | | no reset cell transmission direction | reset bit = OFF | |

Fig. 8 transition by cell transmission judging unit 406

| input cell state | output buffer 116 | output cell state | output buffer 116 |
|---|---|---|---|
| available | N>0 | occupied | N=N-1 |
| | N=0 | available | N=0 |
| occupied | | occupied | | one clock one clock

|    | T1 | T2 | T3 | T4 | T5 | T6 | T7 |
|----|----|----|----|----|----|----|----|
| S1 | P1 | P2 | P3 | P4 | P1 | P2 | P3 |
| S2 | P4 | P1 | P2 | P3 | P4 | P1 | P2 |
| S3 | P3 | P4 | P1 | P2 | P3 | P4 | P1 |
| S4 | P2 | P3 | P4 | P1 | P2 | P3 | P4 |

Fig. 13

| input port number | regulation flag | cause flag | | | |
|---|---|---|---|---|---|
| | | #1 | #2 | #3 | #4 |
| #1 | 1 | 1 | 1 | 0 | 0 |
| #2 | 1 | 1 | 0 | 0 | 0 |
| #3 | 0 | 0 | 0 | 0 | 0 |
| #4 | 0 | 0 | 0 | 0 | 0 |

Fig. 19

| X | Y | reset cell direction mode |
|---|---|---|
| ON | ON | free mode |
| ON | OFF | NT regulation mode |
| OFF | / | not reset cell |

Fig. 21 transition by cell transmission judging unit 2001

| input cell state | mode | internal state upon input | output cell state | internal state upon output |
|---|---|---|---|---|
| available | free mode | N>0,C>0<br>N=0, —<br>— ,C=0 | occupied<br>available<br>available | N=N-1,C=C-1 |
| | NT regulation mode | N1>0,C>0<br>N1=0, —<br>— ,C=0 | occupied<br>available<br>available | N1=N1-1,C=C-1 |
| occupied | | | occupied | |
| X bit=ON | | | | C=Cwindow |

Fig. 23 transition by cell header converting unit 2201

| input cell state | | internal state upon input | output cell state | internal state upon output |
|---|---|---|---|---|
| available | | | available | |
| occupied | for itself | | occupied | |
| | for another | | available | |
| reset judge bit T=ON | | hunt state or regulation state | reset bit = OFF reset judge bit T=ON | |
| | | neither hunt state nor regulation state | X = ON, Y = ON reset judge bit T=ON | hunt state timer restart |
| reset judge bit T= OFF | | | reset judge bit T=ON | |
| X bit=ON | | | X bit = OFF | release hunt state |
| X bit=OFF | | reset cell transmission direction & not regulation | X = ON, Y = ON (free mode) | hunt state timer restart |
| | | reset cell transmission direction & regulation | X = ON, Y = OFF (NT regulation mode) | |
| | | no reset transmission direction | X = OFF | |

Fig. 24

| X | Y | reset cell direction mode |
|---|---|---|
| ON | ON | free mode |
| ON | OFF | NT regulation mode |
| OFF | ON | TE regulation mode |
| OFF | OFF | not reset cell |

Fig. 26 transition by header converting unit 2502

| input cell state | output cell state |
|---|---|
| available | available |
| occupied; destined for another device | occupied available |
| reset judge bit T = ON | T = ON (N = 0 or C = 0) <br> T = OFF (N>0 and C>0) |
| reset judge bit T = OFF | T = OFF |
| X=ON and regulation | X = OFF |
| X=ON and no regulation | X = ON(unchanged) |

Fig. 27 transition by cell transmission judging unit 2503

| input cell state | mode | internal state upon input | output cell state | internal state upon output |
|---|---|---|---|---|
| available | free mode | N>0,C>0 <br> N=0, — <br> — ,C=0 | occupied <br> available <br> available | N=N-1,C=C-1 |
| | NT regulation mode | N1>0,C>0 <br> N1=0, — <br> — ,C=0 | occupied <br> available <br> available | N1=N1-1,C=C-1 |
| | TE regulation mode | N2>0,C>0 <br> N2=0, — <br> — ,C=0 | occupied <br> available <br> available | N2=N2-1,C=C-1 |
| occupied | | | occupied | |
| X bit=ON | | | | C=Cwindow | transition by cell transmission judging unit 3001

| input cell state | internal state upon input | output cell state | internal state upon output |
|---|---|---|---|
| available | N>0,C>0,S=ON<br>N1>0,C>0,S=OFF<br>N=0 or C=0 | available<br>available<br>occupied | N=N-1,C=C-1<br>N1=N1-1,C=C-1 |
| occupied | | occupied | |
| reset bit=ON | | | C=Cwindow |

FLOW CONTROL METHOD

BACKGROUND OF THE INVENTION

1. Field of the Invention

The present invention relates to a method of preventing the overflow of cells, each including multi-media information in a communication network, based on an ATM (Asynchronous Transfer Mode).

2. Description of the Related Art

Recently, an ATM (Asynchronous Transfer Mode) has been put to practical use as a communication method of transmitting/receiving data at high speed. According to an ATM mode, user devices linked to a ring network load data on a packet having a fixed length and going round the ring to communicate. A packet is called a cell.

A plurality of ring networks are connected to each other by a cell switch (hereafter called a switch), and a cell can be transmitted from one network to another network by a switch. A switch has a plurality of input/output ports, and a single ring is connected to one of the input/output ports. To define broadly, a switch may have one of the following two structures. One of them is an input buffer type switch which has a buffer at the input side, and the other is an output buffer type switch which has a buffer at the output side.

When using an input buffer type switch, cells from input ports await transmission in the input buffer. Bandwidth in a single output port is shared by traffic from a plurality of input ports. If the number of cells in the input buffer increases in such a manner that causes an overflow, cells will be abandoned.

When using an output buffer type switch, cells from a plurality of input ports are switched by the switch before being transmitted to the respective output buffer. Subsequently, the output buffer transmits a cell to the ring network. If the traffic amount to an output buffer is great as compared to the bandwidth of the respective output port so that the output buffer is likely to overflow, some adjustment such as cell abandonment will be performed. Thus, when using an output buffer type switch, traffic from a plurality of input ports concentrate on a single output port, so that the total traffic amount could exceed the bandwidth of the output port. As a result, the output buffer overflows, and cells are abandoned. It is generally perceived that an output buffer type switch performs better than an input buffer type switch in terms of controlling overflow.

Abandonment of cells could be avoided by making the bandwidth large enough to assure the peak speed of cells as for each traffic. However, if the bandwidth is thus set for traffic of LAN data whose peak speed is great but traffic density is small, the throughput of a switch will be very small. To enhance the throughput of a switch, bandwidth must be set to assure the average speed rather than the peak speed if the quality of data is not highly requested. Even in this case, cells must be abandoned if a plurality of input ports happen to transmit cells simultaneously. In the prior art, the problem of cell abandonment has been solved by having the destination terminal identify abandonment of a cell, and request its re-transmission.

Japanese Laid-open Patent Application No. 4-291851 proposes "a method of notifying node state in a loop type LAN" (hereafter called prior art 1) to reduce re-transmissions of cells. In this method, when a node is busy, it notifies other nodes of its busy state by means of a busy notice cell. Accordingly, transmission to the node ceases. If controlling input/output ports based on this method, cell abandonments and re-transmissions will be expectedly reduced. Therefore, abandonment of cells by a switch can be partly prevented.

Also, a switch has to enable communications among a plurality of users linked to a single input/output port. Electronic information communication institute technical research report SSE 91-95, "Evaluation of GFC (Generic Flow Control) protocol in ATM-UNI (User Network Interface)" (hereafter called prior art 2) proposes a method of controlling the transmission amount from a plurality of user terminals to a network.

The basic operation of a user terminal in the prior art 2 is described. A plurality of user devices and a network controller are connected in a ring in the logical sense, and input/output of cells is controlled. The limit on the number of cells which can be transmitted to the ring, and a counter for counting the number of cells which have been transmitted are provided to each user terminal beforehand. One cycle represents the state of a user terminal in which the user terminal can transmit cells each carrying its own data. And a user terminal can transmit cells in one cycle up to the limit. A cell is structured into two parts: an area indicating the cell is a rest cell and an area indicating every user terminal has completed its transmissions. A user terminal completes its transmissions when the limit is reached or no cells to be transmitted exist.

When the network controller detects that every user completes transmissions, it sends a reset cell in the network which resets the counter. Upon each reset of the counter, a next cycle starts. When a reset cell is detected in the ring, a next cycle also starts. Consequently, flow control is fair to users in one cycle.

However, prior art 2 set forth in the above, re-transmission of a cell is requested after it was abandoned. Therefore, even when an output buffer is in an overflow state, cells could be transmitted to it. Further, re-transmission increases traffic, which makes cell abandonment more likely. As a result, the reliability of a system itself designed to be tolerant with cell abandonment is deteriorated.

Even the prior art 1 which aims at overcoming the above problem has another problem of control delay because the transmitting terminal has to fabricate a busy notice cell and the receiving terminal has to analyze a cell. Fabricating a busy notice cell and analyzing a cell are processed at a level higher than an ATM Adaptation Layer (AAL), and implemented by software.

Not only with a switch, but also with a line concentrator which has a plurality of low-speed input ports and converting traffics from them into one high-speed communication path (ATM MUX: Multiplexer), the same problem remain unsolved.

SUMMARY OF THE INVENTION

It is a first object of the present invention to provide a flow control method of enhancing throughput of a device such as a switch device and of preventing cell abandonment in the device, further to provide a method of controlling quickly and reducing control delay. Particularly when transmitting a packet, the flow control method enhances throughput and reduces control delay at packet level.

It is a second object of the present invention to permit transmission of data even when an overflow is likely to occur to the extent that the transmission does not interfere with the elimination of the overflow problem.

It is a third object of the present invention to control flow of data as assuring the quality of a plurality of communications, and control flow in accordance with variety in the quality.

The first object may be fulfilled by a flow control device constructed at a switch device for connecting a plurality of ring networks which convey a cell carrying data and exchanging data of a cell among the plurality of ring networks, to each ring network a user device is connected for loading data on a cell and transmitting up to a window counter's counting number of cells, the window counter indicates the number of cells which can be used for transmission of data at most, such flow control device comprising a buffer monitoring unit for monitoring the number of data in one of a plurality of output buffers, the plurality of output buffers corresponding to the plurality of ring networks one to one, a regulation judging unit for comparing the number of data in each buffer with a first threshold value representing state of the buffer which is in danger of overflow, with a second threshold value representing state of the buffer which is not in danger of overflow, and outputting a regulation notice by which data flowing to the buffer is regulated when the number of data is greater than the first threshold value while outputting a release notice by which the regulation notice is released when the number of data is smaller than the second threshold value, a plurality of traffic controlling units corresponding to the buffers one to one, each traffic controlling unit transmitting to the respective ring network a reset cell by which the window counter of a user device is reset to initial value at a first interval when the traffic controlling unit does not receive the regulation notice relating to the respective buffer, and transmitting to the respective ring network the reset cell at a second interval which is longer than the first interval when it receives the regulation notice relating to the respective buffer, wherein each user device resets the window counter to initial value upon reception of the reset cell.

The plurality of buffers may include a plurality of input buffers for storing cell data received from each ring network or a plurality of output buffers for storing cell data exchanged by the switch device so that it can be transmitted to each ring network and/or another network.

The first threshold value may be set to assure that a remaining capacity which is obtained by subtracting a maximum number of data which can be stored in each buffer from total capacity of the buffer is a predetermined value or smaller, and the second threshold value may be set to assure sufficient remaining capacity.

The predetermined value may be obtained by subtracting the product of V and T from $W_{total}$ or more where if a maximum number of cells each user device can transmit to the switch device is a transmissible cell number, $W_{total}$ is the total of transmissible cell numbers of each user device; V is the speed at which cells in the buffer are reduced; and T is the shortest time required for the buffer to transmit $W_{total}$ number of cells.

The first interval may be set to assure that use of cells is fair to each user device, and the second cycle is set to solve the danger of overflow.

Each cell may include a reset flag which directs the user device to reset the window counter, and the traffic controlling unit may comprise a timer for generating a time-out when it has counted from a given initial value to 0, and re-starting to count upon each transmission of the reset cell, a reset controlling unit for providing a first initial value corresponding to the first interval when the regulation notice is not outputted from the regulation judging unit or the release notice is outputted, and for providing a second initial value corresponding to the second interval when the regulation notice is outputted, and a flag setting unit for setting the reset flag included in each cell upon each time-out by the timer, wherein the first and second intervals are timed by the timer which starts from the first initial value and second initial value respectively and times out periodically.

With this construction, when a switch device is likely to overflow, reset cells are transmitted to a user device less frequently (longer reset cycle) compared to usual situation (overflow is not likely to occur). Accordingly, the user device resets its window counter less frequently, and transmission of cells from the user device is regulated. Consequently, the dangers of overflow and cell abandonment are solved.

The second object may be fulfilled by the above flow control device wherein each cell includes regulation information which directs regulation if cells destined for the switch device should be regulated, and the flag setting unit sets the reset flag, and sets the regulation information to direct regulation simultaneously.

With this construction, when overflow is likely to occur, regulations to transmission and reception of cells to and from a user device are eased by stages. Therefore, compatibility between elimination of overflow possibility and cell transmission-reception is adjusted in greater detail.

The reset controlling unit may decrease the second initial value by stages and provides it to the timer.

With this construction, regulation to cell transmission and reception which prevents overflow is released step by step; therefore, overflow can be solved as permitting cell transmission and reception precisely.

The reset controlling unit may prohibit counting by the timer when the regulation notice is outputted.

Each cell may further include a regulation flag which prohibits transmission of cells from the user device to the switch device, and the flag setting unit may set the regulation flag only when the regulation notice is outputted, wherein the user device transmits a cell destined for another user device when the regulation flag of the cell is set.

The third object may be fulfilled by a flow control device constructed at a user device which is connected to a ring network which conveys a cell carrying data, the user device communicates by transmitting up to a window counter's counting number of cells carrying data, the window counter indicating a maximum number of cells available for data transmission, each user device resets the window counter according to a cell for directing reset information transmitted from a management device for managing cells in the ring network; each user device comprises a first transmission buffer for storing cell data to be transmitted, a second transmission buffer for storing another cell data to be transmitted, and a reception buffer for storing cell data received from the ring network and destined for the user device itself; and the cell includes reset information indicating if the window counter should be reset, first prohibition information indicating if transmission of cell data from the first transmission buffer should be prohibited, and second prohibition information indicating if transmission of cell data from the second transmission buffer should be prohibited, such flow control device comprising a buffer monitoring unit for monitoring the number of data stored in the reception buffer of the user device, a regulation judging unit for comparing the number of data in the buffer with a first threshold value representing state of the buffer which is in danger of overflow, with a second threshold value representing state of the buffer which is not in danger of overflow, and outputting a regulation notice by which data flowing to the buffer is regulated when the number of data is greater than the first threshold value while outputting a release notice by which the regulation notice is released when the number of data is smaller than the second threshold value, a prohibition information setting unit for positively confirming the second prohibition information when the regulation judging unit outputs the regulation notice and the reset information included in a received cell directs reset, a prohibition information storing unit for storing the first and second prohibition information included in the received cell when its reset information directs reset, and a cell transmission judging unit for prohibiting transmission of cell data from the first and second transmission buffer in accordance with the first and second prohibition information stored in the prohibition information storing unit respectively.

The first transmission buffer may store cell data destined for the management device linked to the ring network, and the second transmission buffer may store cell data destined for another user device linked to the ring network.

The first transmission buffer may hold priority data and the second transmission buffer holds non-priority data.

With this construction, when there are a plurality of levels for the cell data to be transmitted and received, flow control can be performed in accordance with both the quality level of the cell data and the elimination of the danger of overflow.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows transition between states of a cell by a header converter 303;

FIG. 5 shows transition between states and internal states of a cell by a cell transmission judging unit 304;

FIG. 7 shows transition between states of a cell by a header converter 405;

FIG. 8 shows transition between states of a cell and an output buffer by a cell transmission judging unit 406;

FIG. 13 shows an example of a regulation port storing unit 991;

FIG. 19 shows combinations of Xbit and Y bit in the third embodiment;

FIG. 21 shows transition between states of a cell by a cell transmission judging unit 2001 in the third embodiment;

FIG. 23 shows transition between states of a cell by a header converter 2201 in the third embodiment;

FIG. 24 shows combinations of Xbit and Y bit in a fourth embodiment;

FIG. 26 shows transition between states of an input-output cell by a header converter 2502;

FIG. 27 shows transition between states of a cell by a cell transmission judging unit 2503;

DESCRIPTION OF THE PREFERRED EMBODIMENTS

Embodiment 1

Figure 1:
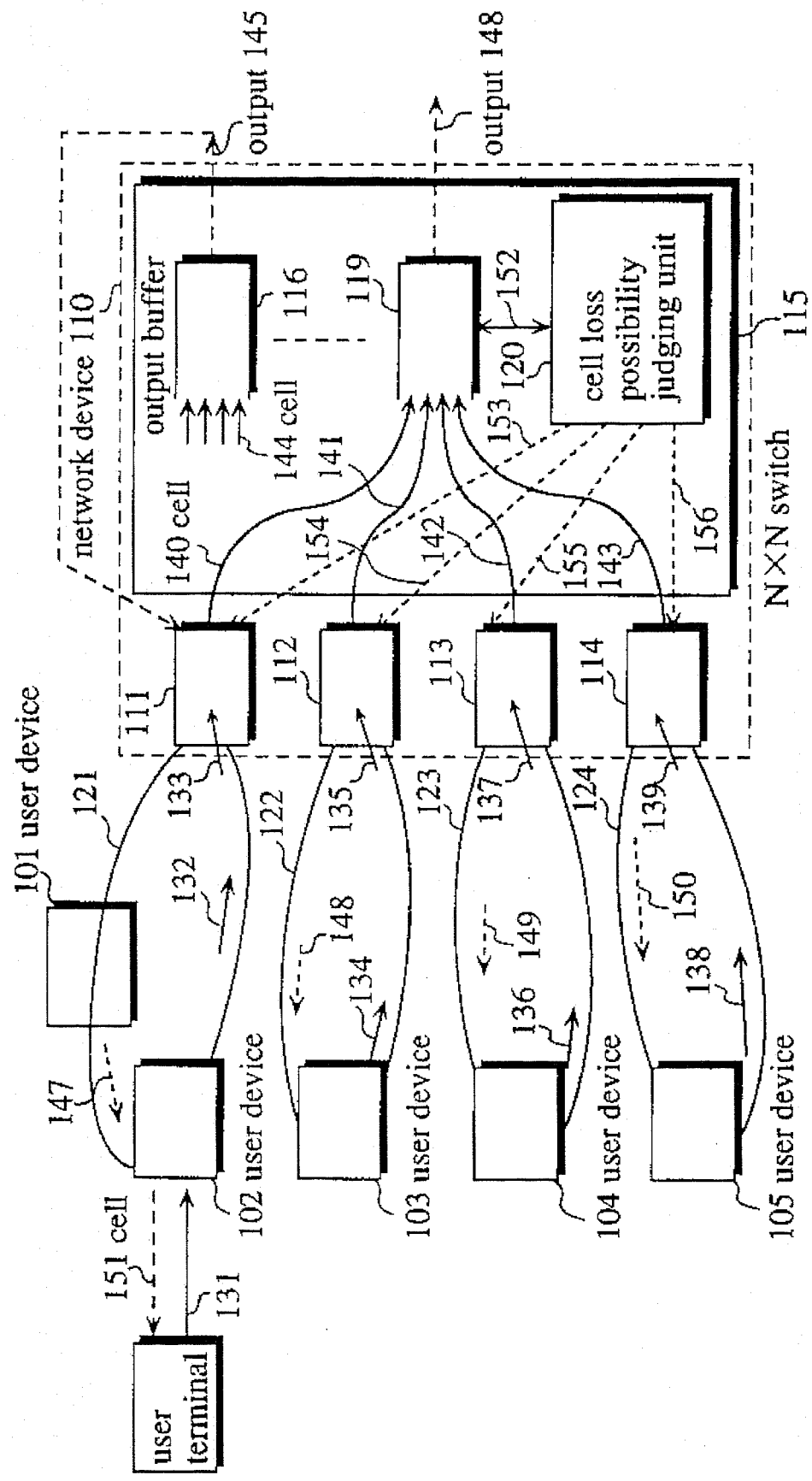
FIG. 1 is a block diagram depicting a major part of an exemplary ATM system to which a flow control method in a first embodiment is applied.

FIG. 1 is a block diagram showing a major part of an exemplary ATM system to which a flow control method in a first embodiment of the present invention is applied. In this system, user devices 101–105 are linked to a plurality of communication paths 121–124; and the communication paths are linked to a single network device 110.

The user devices 101–105 are constructed at terminals (computers, telephones, data processing devices etc); each of them communicates with other user devices via the respective communication path, or via the respective communication path and network device by transmitting to/receiving from cells. Each user device has a counter called a window counter, and can transmit the number of cells within a counting number at the window counter.

Figure 2:
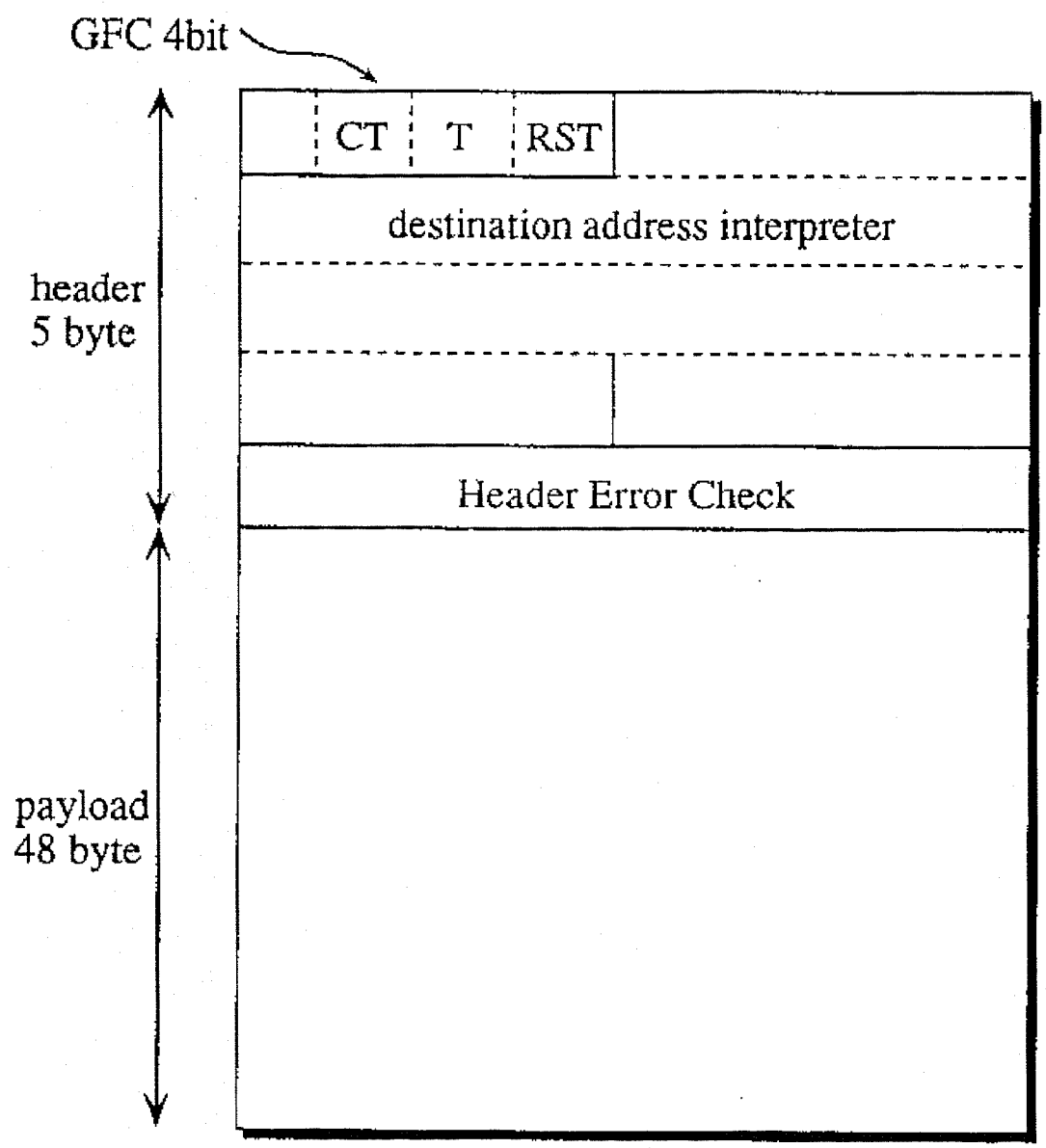
FIG. 2 shows the format of a cell.

FIG. 2 shows the format of a cell. The cell format shown here has the same content as ITU-TSA recommendation, L.361 standard. However, this standard is still at the research stage as regards four-bit GFC fields, and so is yet to be established as a recognized standard.

CT bit—this CT bit indicates if the cell is available or is occupied. The payload part of an occupied cell is filled with effective data; while that of an available cell remains available. CT bit is set to ON ("1") when a user device or a traffic controller loads data to be transmitted on the payload part; while CT bit set to OFF ("0") when the destination user device, network device takes data out.

T bit—this T bit indicates if no user terminal linked to a communication path can transmit a cell or no data to be transmitted exists, and the T bit is examined by a traffic controller corresponding to the communication path. Stated otherwise, a traffic controller decides if it can reset a window counter in every user device by interrogating the Tbit. A traffic controller always sets T bit from OFF to ON. When a user device receives a cell whose T bit is ON and it cannot transmit the cell (window counter=0) or no data to transmit exits, the user device leaves the T bit ON. On the other hand, when the user device can transmit the cell and data to transmit exists, it sets the Tbit from ON to OFF.

RST bit—when this RST bit is ON, a user device rests the window counter to an initial value. Generally, a traffic controller sets RST bit=ON at definite intervals, but it does not do so when a network device 110 judges that the respective network is likely to overcome.

The destination address of a cell and information relating to codes for error examination are loaded on the header part outside of the GFC field.

Data to be transmitted is loaded on the payload part.

The network device 110 comprises traffic controllers 111–114, a cell switch 115, and N input-output ports (4 input-output ports in the figure) to be connected to transmission paths 121–124. Cells are switched among these input-output ports.

The traffic controllers 111–114 correspond to input-output ports of the network device 110, each controlling cells flowing to the respective input-output port. Each traffic controller receives a cell in the respective communication path via the input port, and outputs it to the switch 115 or outputs it to the communication path from the output port. Also, each traffic controller outputs a cell received from the switch 115 as a result of the switching to the transmission path from the output port. Further, each traffic controller receives a regulation notice which directs to regulate cell flow and a regulation release notice which directs to release regulation to cell flow from the cell loss possibility judging unit 120, and controls cell flow in the communication path respectively. For example, when receiving a regulation notice, the traffic controller 111 stops transmitting cells with RST bit ON (hereafter called reset cells) periodically. Subsequently, when receiving a regulation release notice, the traffic controller 111 starts to transmit reset cells at definite intervals again. Accordingly, a user device cannot initialize the window cell without receiving a reset cell. Consequently, the amount of cell flowing in the traffic controller 111 is regulated.

The switch 115 comprises output buffers 116–119, and a cell loss possibility judging unit 120. The switch 115 switches cells received from the traffic controllers 111–114 according to the destinations and outputs each cell to one traffic controller depending on the destination. Also, according to the state of an output buffer, the switch 115 directs the traffic controllers 111–114 to regulate the cell flow(s).

The output buffers 116–119 correspond to input-output ports of the network device 110. When receiving a cell from the switch 115, the output buffers 116–117 transmit the cell to the traffic controller which corresponds to the output port.

The cell loss possibility judging unit 120 judges as for each of the output buffers 116–119 if cell abandonment is likely to occur (overflow). Subsequently, if the cell loss possibility judging unit 120 judges that an output buffer is likely to abandon cells, it notifies the traffic controller which transmits cells to the output buffer to regulate input of cells from the input port. Subsequently, if the cell loss possibility judging unit 120 judges that the output buffer is not likely to abandon cells any longer, it notifies the traffic controller to stop regulating input of cells.

Communication paths 121–124 are the links used when a user device transmits a cell to a different communication path via the traffic control device or when a user device receives a cell from another communication path via the traffic control device and other user devices. As shown in the diagrams, each communication path connects user devices and an I/O port (traffic control unit) of the network device so as to form a ring. One input-output port of the network device is linked to each communication path. A plurality of user devices are connected to one communication path, such as for the communication path 121. Otherwise, a single user device is connected to one communication path, such as for the communication path 122. FIG. 1 shows only the parts required for the following explanation. When an N×N switch is constructed, N communication paths, N traffic controllers, N output buffers, and N input-output ports are provided.

An arrow 131 shows data flowing from the user terminal to the user device.

Each of arrows 132–139 shows cells flowing from the user device to the traffic controller.

Each of arrows 140–143 shows cells flowing from the traffic controller to the output buffer 117; and arrows 144 show data flowing the traffic controllers to the output buffer 116.

An arrow 145 shows data flowing from the output buffer 116 to the traffic controller 111; similarly, an arrow 146 shows data flowing from the output buffer 119 to the traffic controller 114.

Each of arrows 147–150 shows cells flowing from the traffic controller to the user device via the communication path.

An arrow 151 shows that the user device transmits cells received from the communication path to the user.

An arrow 152 shows that the cell loss possibility judging unit 120 judges if the output buffer 117 is likely to abandon cells or overflow. Arrows 153–156 indicate that the cell loss possibility judging unit 120 sends a cell flow regulation notice or a regulation release notice to each traffic controller.

Detailed Configuration of User Device

Figure 3:
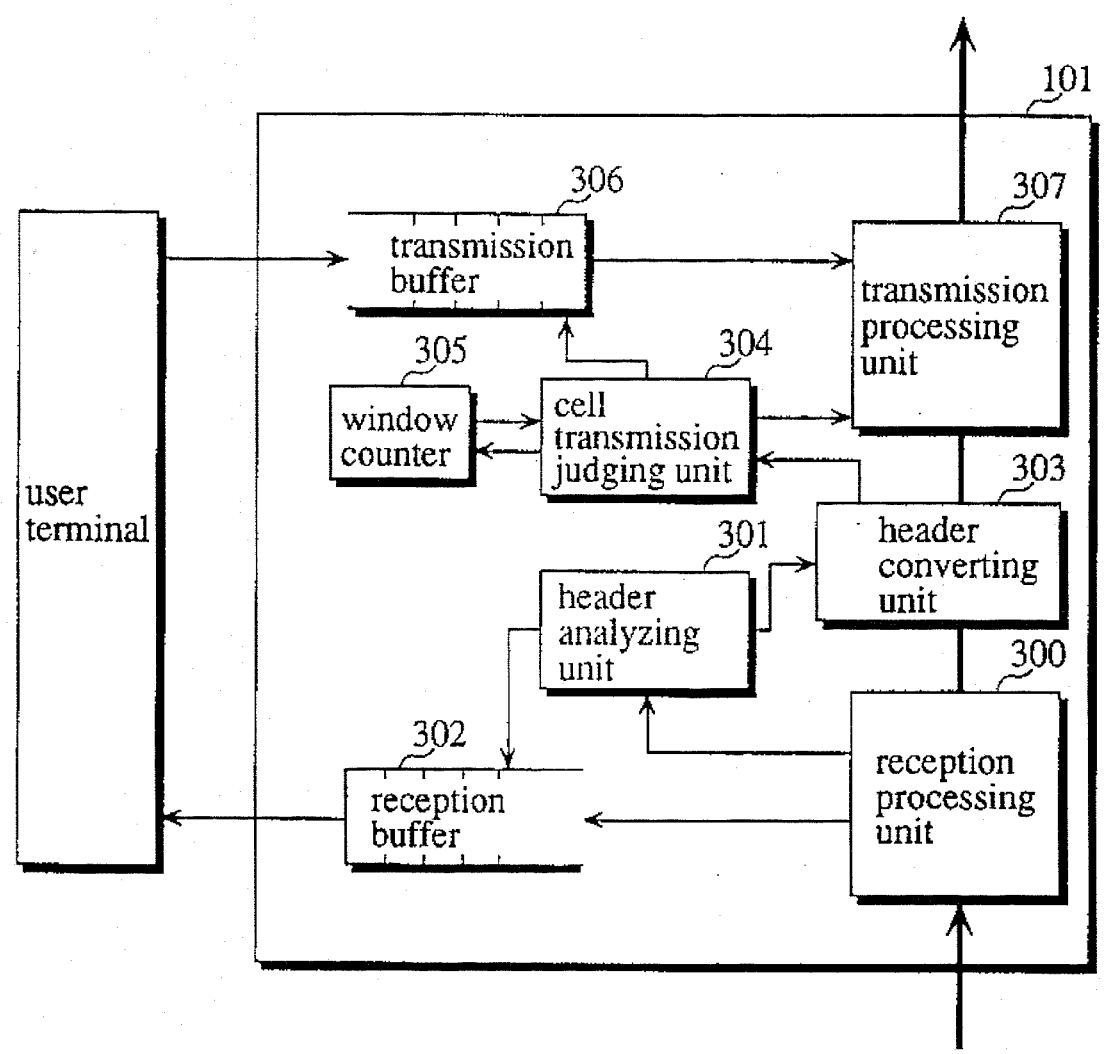
FIG. 3 is a block diagram depicting the detailed configuration of a user device.

FIG. 3 is a block diagram depicting the detailed configuration of a user device. All user devices have the same configuration, so that the configuration of a user device 101 is described herein. The user device 101 in FIG. 3 comprises a reception processing unit 300, a header analyzing unit 301, a reception buffer 302, a header converting unit 303, a cell transmission judging unit 304, a window counter 305, a transmission buffer 306, and a transmission processing unit 307.

The reception processing unit 300 receives cells from the communication path 121, and outputs them to the header converter 303, as well as outputs header and payload of the cells to the header analyzing unit 301 and the reception buffer 302 respectively.

The header analyzing unit 301 analyzes header of the received cells, and notifies the analyzing result to each component. Also, if a received cell is a occupied cell destined for itself, the header analyzing unit 301 stores data of the cell into the reception buffer 302.

Directed by the header analyzing unit 301, the reception buffer 302 stores data loaded on a cell destined for itself.

Receiving the analyzing result from the header analyzing unit 301, the header converting unit 303 converts the state of a cell inputted from the reception processing unit 300 according to the states of the window counter 305 and the transmission buffer 306. FIG. 4 shows transition between the states of a cell by the header converting unit 303. In FIG. 4, the column of "input cell state" indicates the analyzing result inputted from the header analyzing unit 301, and the column of "output cell state" indicates the converting result inputted from the header converting unit 303. The header converting unit 303 converts the state of a cell as follows.

As for CT bit, when CT bit=OFF (available), the header converting unit 303 does not change the CT bit;

when CT bit=ON (occupied) and the cell is destined for another device (destination addressee=its address), the header converting unit 303 changes the CT bit to OFF.

As for T bit, when T bit=OFF, the header converting unit 303 does not change the T bit;

when T bit=ON, and the device cannot transmit any cell (window=0) or no data to be transmitted exists, the header converting unit 303 does not change the T bit;

when T bit=ON, the device can transmit a cell (window>0) and data to be transmitted exists, the header converting unit 303 changes the T bit to OFF.

Receiving the converting result from the header converting unit 303, the cell transmission judging unit 304 judges if a cell can be transmitted depending on the states of the window counter 305 and the transmission buffer 306, and controls transmission of cells according to the judging result. When RST bit is ON, the cell transmission judging unit 304 resets the window counter 305 to initial value. FIG. 5 shows transition between the states of a cell, and between the internal states by the cell transmission judging unit 305. In FIG. 5, the column of input cell state indicates the state of a cell inputted by the header converting unit 303; and the column of output cell state indicates the converting result by the cell transmission judging unit 304. The columns of internal state upon input and internal state upon output indicate the number of data (N in FIG. 5) stored in the reception buffer 302 and a counting number (C in FIG. 5) at the window counter 305. As shown in FIG. 5, when a cell from the header converting unit 303 is available (CT=OFF), data to transmit exists in the transmission buffer 306, and a counting number at the window counter is other than 0 (N>0 and C>0), the cell transmission judging unit 304 loads the top data at the window counter 305 on the payload of the received cell, and controls the transmission processing unit 307 to transmit the cell. Accordingly, the number of data remaining in the transmission buffer 306 decreases by one (N=N−1), and the counting number at the window counter 305 decreases by one (C=C−1). Otherwise (N=0 or C=0), transmission of a cell carrying new data is not operated. If a cell received from the header converting unit 303 is occupied, the cell is directly transmitted from the transmission processing unit 307. At the same time, when the RST bit is ON, the cell transmission judging unit 304 resets the window counter 305 to initial value (Cwindow).

The window counter 305 comprises a down counter. Upon each transmission of data from the transmission buffer 306, the window counter decreases the counting number by one. The counting number indicates how many cells can be transmitted by the user device 101, and becomes initial value (Cwindow) when the down counter is reset by the cell transmission judging unit 304.

The transmission buffer 306 is a FIFO type memory for storing data to be transmitted from a user terminal.

Controlled by the cell transmission judging unit 304, the transmission processing unit 307 loads data in the transmission buffer 306 onto a cell from the header converting unit 303. Otherwise, the transmission processing unit 307 directly transmits a cell received from the header converting unit 303 to the ring.

Detailed Construction of Traffic Controller

Figure 6:
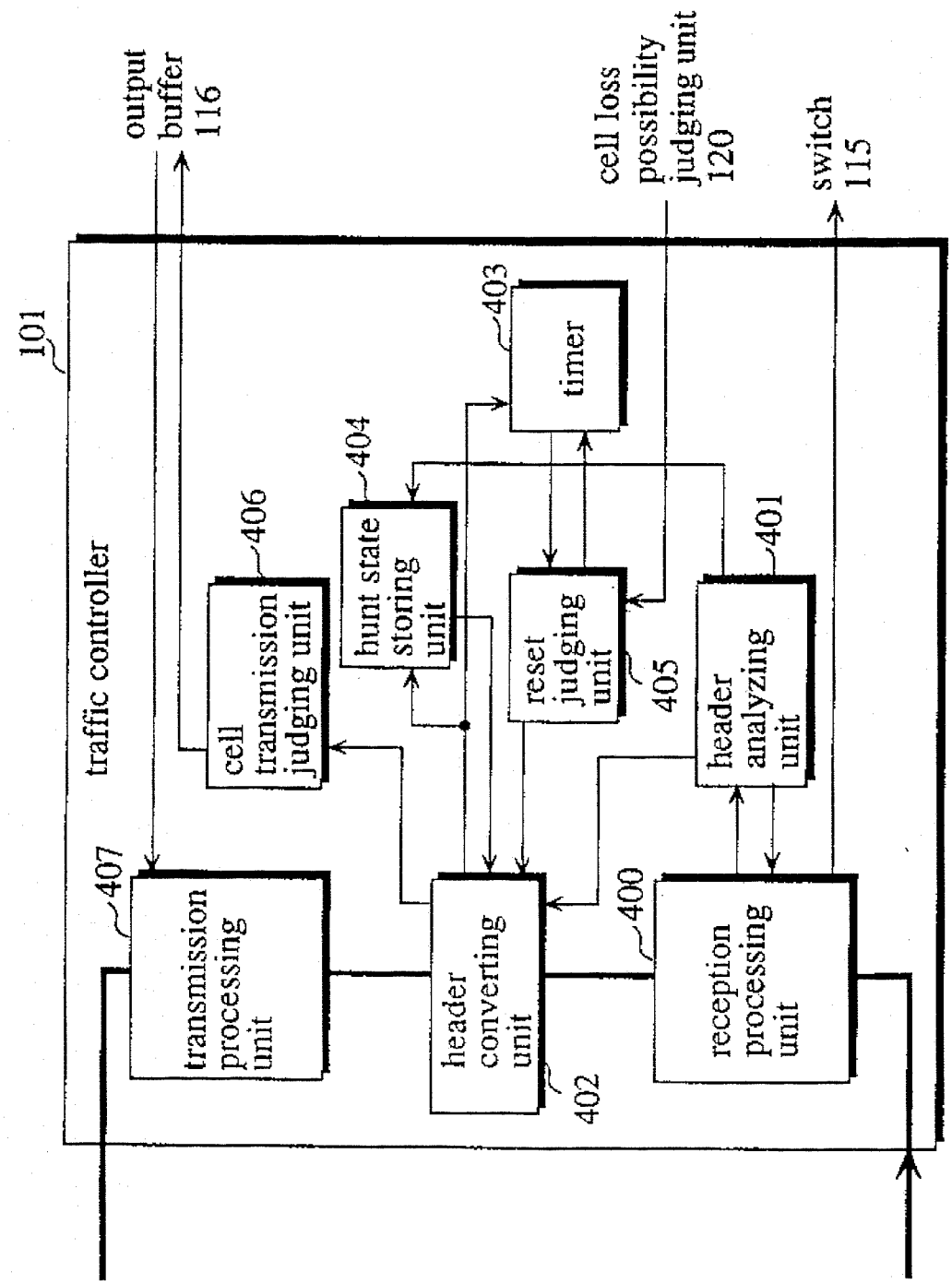
FIG. 6 is a block diagram depicting the detailed configuration of a traffic controller in a network device 110.

FIG. 6 is a block diagram showing the detailed configuration of the traffic controller in a network device. Every traffic controller has the same configuration, and the configuration of a traffic controller 111 is described. The traffic controller 111 in FIG. 6 comprises a reception processing unit 400, a header analyzing unit 401, a header converting unit 402, a timer 403, a hunt state storing unit 404, a reset judging unit 405, a cell transmission judging unit 406, and a transmission processing unit 407.

The reception processing unit 400 functions as an input port of the network device 110. The reception processing unit 400 receives a cell from the communication path 121, and outputs the cell to the header converting unit 402. Directed by the header analyzing unit 401, the reception processing unit 400 outputs data in a cell destined for itself to the switch 115.

The header analyzing unit 401 analyzes a received cell, and notifies the analyzing result to each component. When a received cell is an occupied cell destined for itself, the header analyzing unit 401 controls the switch 115 to output data in the cell to the reception processing unit 400.

The hunt state storing unit 404 stores a hunt cycle which refers to the period since the transmission processing unit 407 transmits a reset cell until the transmitted reset cell makes a round of the communication path and returns to the starting point. Therefore, consecutive transmissions of a plurality of reset cells can be avoided. More specifically, the hunt state storing unit 404 has a first FF (flip-flop) internally. When the header converting unit 402 sets RST bit to ON (RST bit=ON), the first FF is set. When the header analyzing unit 401 receives a cell whose RST bit is ON, the first FF is reset.

The timer 403 starts to count down from initial value upon each transmission of a reset cell, and informs the reset judging unit 405 of time-out when the timer 403 counts down to 0. An initial value determines a reset cycle, and it has a first initial value and a second initial value. The first initial value is referred during ordinary operation (overflow is not a possibility), and one reset cycle is obtained by (the time required to transmit the window size of cells at each user device)+(the time required to control transmission of a reset cell). The second initial value is referred when the cell loss possibility judging unit 120 judges that overflow is a possibility. The second initial value is set to make a reset cycle longer than the rest cycle set by the first initial value (twice, three times). The reset judging unit 405 determines which of the initial values, the first initial value or the second intimal value, to employ.

According to a regulation notice, a regulation release notice from the cell loss possibility judging unit 120, time-out from the timer 403, and the state of the hunt state storing unit 404, the reset judging unit 405 outputs a signal indicating if transmission of reset cells should be regulated and a signal which directs transmission of a reset cell to the header converting unit 402. To be concrete, when receiving a regulation notice from the cell loss possibility judging unit 120, the reset judging unit 405 starts to regulate transmission of reset cells. Then, when receiving a regulation release notice from the same, the reset judging unit 405 releases the regulation. To indicate whether or not transmission of reset cells is under regulation, a second FF (flip flop) which is constructed internally (not illustrated) is set/reset by a regulation notice/a regulation release notice. Upon each time-out from the timer 403, the reset cell judging unit 405 activates the signal which directs to transmit reset cells. Further, if transmission is not under regulation (the second FF=0), the reset cell judging unit 405 sets the first initial value to the timer 403. Or if transmission is under regulation (the second FF=1), the reset cell judging unit 405 sets the second initial value to the timer 403. Accordingly, when the output buffer 116 is likely to overflow, the time taken before a time-out is extended; consequently, reset cells will be transmitted less frequently.

Receiving the analyzing result from the header analyzing unit 401, the header converting unit 402 converts the state of a cell inputted by the reception processing unit 400 according to the state of the hunt state storing unit 404 and a direction from the reset judging unit 405. FIG. 7 shows transition between the states of a cell by the header converting unit 402. In FIG. 7, the column of input cell state shows the analyzing result from the header analyzing unit 401; the column of output cell state shows the converting result from the header converting unit 402; and the columns of internal state upon input and internal state upon output show the state of the hunt state storing unit 404 and an output signal from the reset judging unit 405 upon input and output respectively.

The header converting unit 402 converts CT bit the same as FIG. 4, and the description is not repeated. Only conversions of T bit and RST bit are described.

T bit:

When T=ON, neither T bit nor RST bit is changed if the hunt state storing unit 404 is in hunt state, or the reset judging unit 405 shows regulation state (T=On, RST=OFF).

When T=ON, RST bit is set to ON (RST=ON) if the hunt state storing unit 404 is not in hunt state and the reset judging unit 405 does not show regulation state (T=ON). Accordingly, the header converting unit 402 converts the hunt state storing unit 404 to hunt state (the second FF is set), and makes the timer 403 restart counting from the first initial value.

When T=OFF, T bit is converted to ON (T bit=ON).

RST bit:

When RST=ON, RST bit is converted to OFF (RST bit=OFF). Accordingly, the header converting unit 402 releases hunt state of the hunt state storing unit 404 (the second FF is reset).

When RST bit=OFF, RST bit is converted to ON (set hunt state, and the timer 403 restarts) if reset transmission direction from the reset judging unit 405 is effective. On the other hand, if reset transmission direction from the reset judging unit 405 is ineffective, RST bit is not changed.

Receiving the converting result from the header converting unit 402, the cell transmission judging unit 406 judges if cells can be transmitted according to the state of the output buffer 116, and controls transmission of cells from the transmission processing unit 407. FIG. 8 shows transition between the states of a cell by the cell transmission judging unit 406 and the states of the output buffer 116. As shown in FIG. 8, only when a cell from the header converting unit 405 is available (CT=OFF) and data to be transmitted exists in the output buffer 116, the transmission processing unit 407 is controlled to transmit data from the output buffer 116. Otherwise, the transmission processing unit 407 transmits inputted cells directly.

Controlled by the cell transmission judging unit 406, the transmission processing unit 407 loads data in the transmission buffer 116 onto a cell from the header converting unit 402, or transmits cells from the header converting unit 402 directly to the ring.

Outline Configuration of Switch 115

Figure 9A:
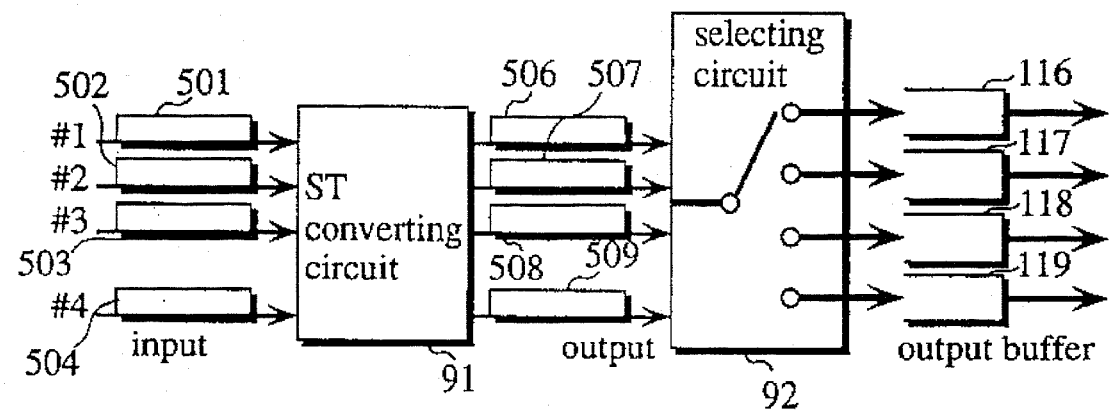
FIG. 9A is a block diagram depicting the outlined configuration of a switch 115 in the conceptual sense.

FIG. 9A is a block diagram depicting the outline configuration of the switch 115. The switch 115 comprises a space time transfer circuit (hereunder called an ST converting circuit) 91 and a selecting circuit 92.

The ST converting circuit 91 converts a cell divided in space into a cell divided in time. The ST converting circuit comprises four input ports #1–#4, and four output ports #1–#4. Cells 501–504 simultaneously arrive at input ports #1–#N respectively, and cells 506–509 are outputted from output ports #1–#N respectively.

Figure 9B:
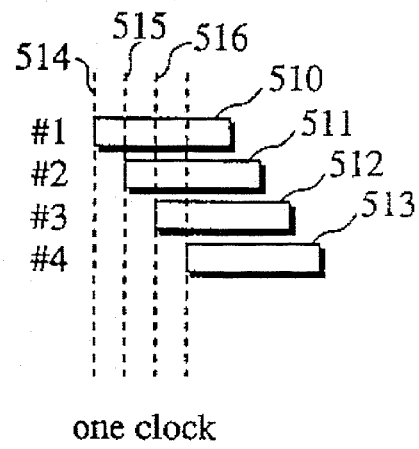
FIGS. 9B and 9C illustrate conversion processing to four cells within an ST conversion circuit 91.
Figure 9C:
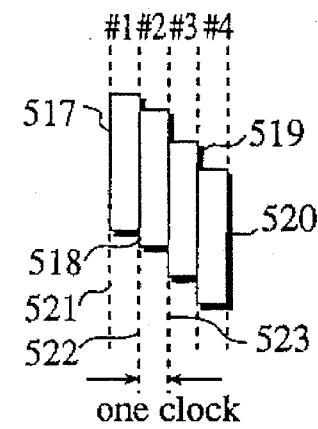

FIGS. 9B and 9C show the converting processing applied by the ST converting circuit 91 internally to four cells. The ST converting circuit 91 delays the cells 501–504 by 510–513 timings. Broken lines 514–516 show clock timings, and a space between two broken lines shows one clock cycle. The converting circuit 91 converts the cells 501–504 so that they are outputted at 517–520 timings respectively. Broken lines 521–524 also show clock timings.

The cells 501–504 which arrive at input ports simultaneously are delayed by 0–3 clocks in FIG. 9B to be cells 510–513. Subsequently, the cells 510–513 are converted into cells 517–520 by the ST converting circuit so that one cell exists in one clock as shown in FIG. 9C. For example, a cell which arrives at the input port #2 is outputted at #2 clock timing. Therefore, even when cells from a plurality of input ports arrive simultaneously, the switch 115 does not need to abandon them, but can output all of them. Also, according to an output clock timing, from which number # of input port a cell is outputted is identified for all cells outputted from the switch 115.

Detailed Configuration of Switch 115

Figure 10A:
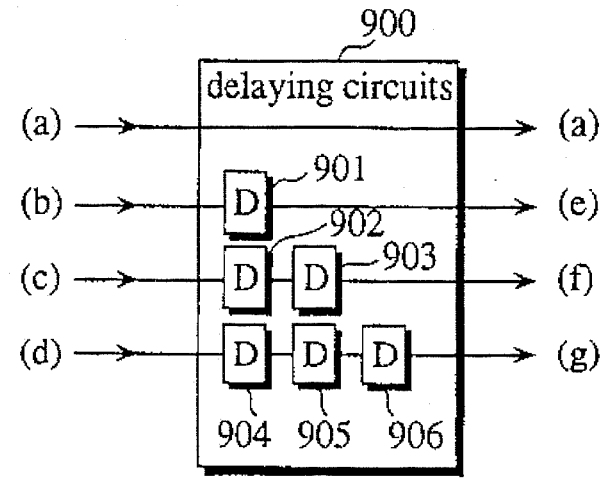
FIGS. 10A, 10B, and 10D are block diagrams depicting the detailed configuration of the ST conversion circuit 91.
Figure 10B:
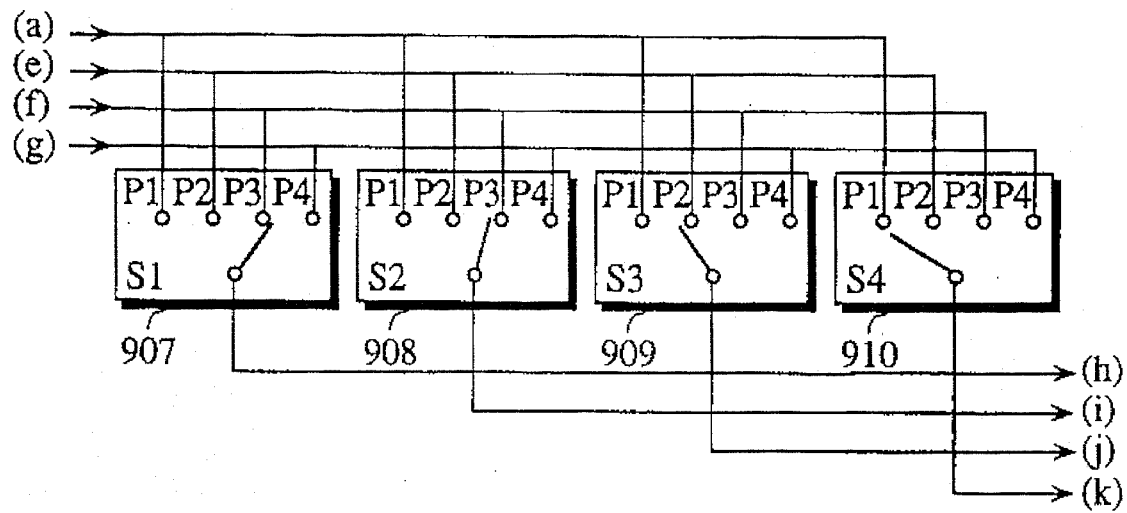
Figures 10C, 10D:
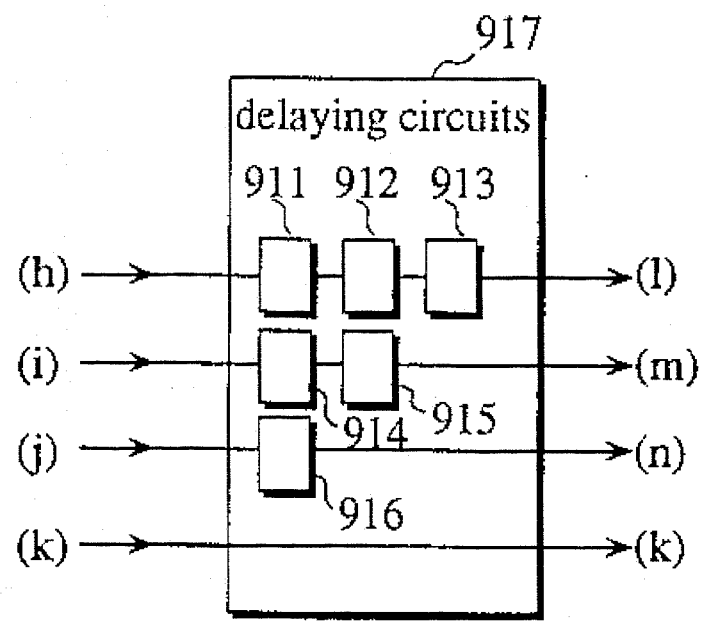
FIG. 10C shows connection positions of selection circuits 907–910 at each timing.

FIGS. 10A, 10B, and 10C are block diagrams depicting the detailed configuration of the ST converting circuit 91. The ST converting circuit 91 comprises delaying circuits 900–906, selecting circuits 907–910, and a delaying circuit 917.

Figure 11A:
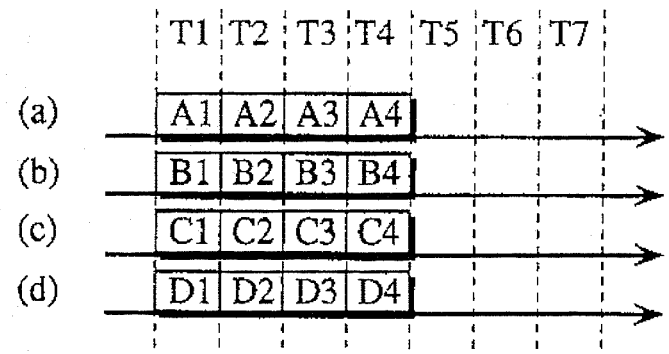
FIG. 11A shows cell input timings for input ports of the ST conversion circuit 91.
Figure 11B:
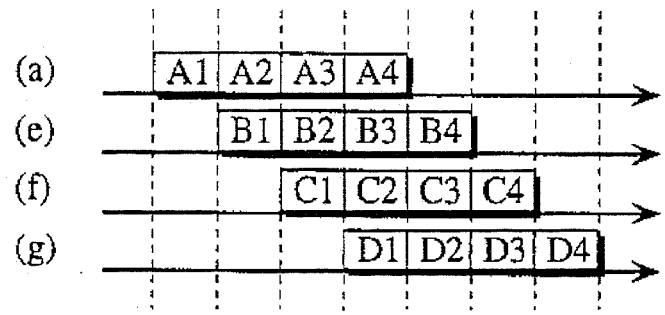
FIG. 11B shows the delaying results by a delay circuit 900.

The delaying circuit 900 comprises six delaying elements 901–906 each for delaying an input signal by one clock, and delaying cells from four input ports by 0–3 clocks. FIG. 11A shows input timings for input ports to input cells; and FIG. 11B show the delaying results by the delaying circuit 900. FIG. 11A (*a*)–(*d*) show timings for cells A–D which are inputted at the same timing from the input ports #1–#4 respectively. For convenience of the description, a cell is four bytes long herein. Each of T1–T7 represents one clock. For example, the cell A inputted from the input port #1 has four-byte structure, A1–A4 and it is inputted in four clocks. FIG. 11B shows delaying timings for the cells. As shown in FIG. 11B (*a*), (*e*), (*f*) and (*g*), the cells A–D are delayed by 0–3 clocks, then are outputted to the selecting circuits 907–910.

Figure 11C:
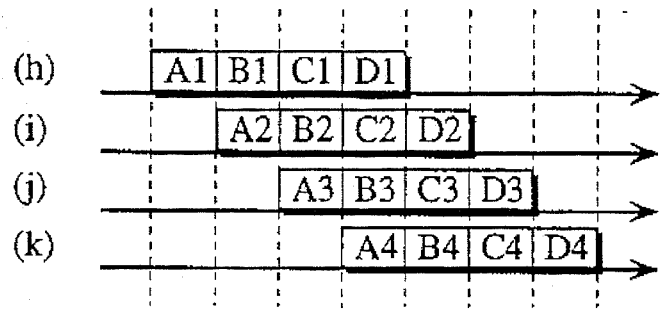
FIG. 11C shows timings at which cell are outputted from selection circuits 907–910.

Each of the selecting circuits 907–910 is a selector which has four inputs and one output. The four selecting circuits work together to shift the timings for output of the four cells by byte. FIG. 10C shows connection positions of the selecting circuits 907–910 at each timing. For example, the selecting circuits 907–910 selects (g), (f), (e), and (a) respectively at clock cycle T4; then they select (a), (g), (f), and (e) at the next clock cycle T5. FIG. 11C shows timings at which cells are outputted from the selecting circuits 907–910. As shown in FIG. 11C (*h*), (*i*), (*j*), and (*k*), the timings for output of cells A–D are shifted by byte.

Figure 11D:
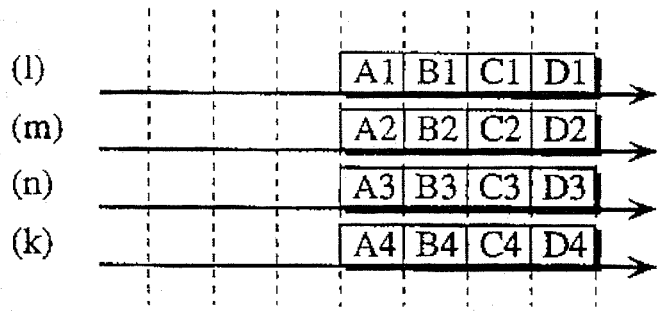
FIG. 11D shows the delaying results by a delay circuit 917.

The delaying circuit 917 comprises six delaying elements 911–916 each for delaying an input signal by one clock, and delaying cells inputted from four input ports by 3-0 clocks. FIG. 11D shows delaying timings for the cells by the delaying circuit 917. As shown in FIG. 11D (*l*), (*m*), (*n*), and (*k*), the cells A–D are delayed by 3-0 clocks respectively. As a result, the delaying circuit 917 outputs the cell A at T4, the cell B at T5, the cell C at T6, and the cell D at T7.

Detailed Configuration of Cell Loss Possibility Judging Unit 120

Figure 12:
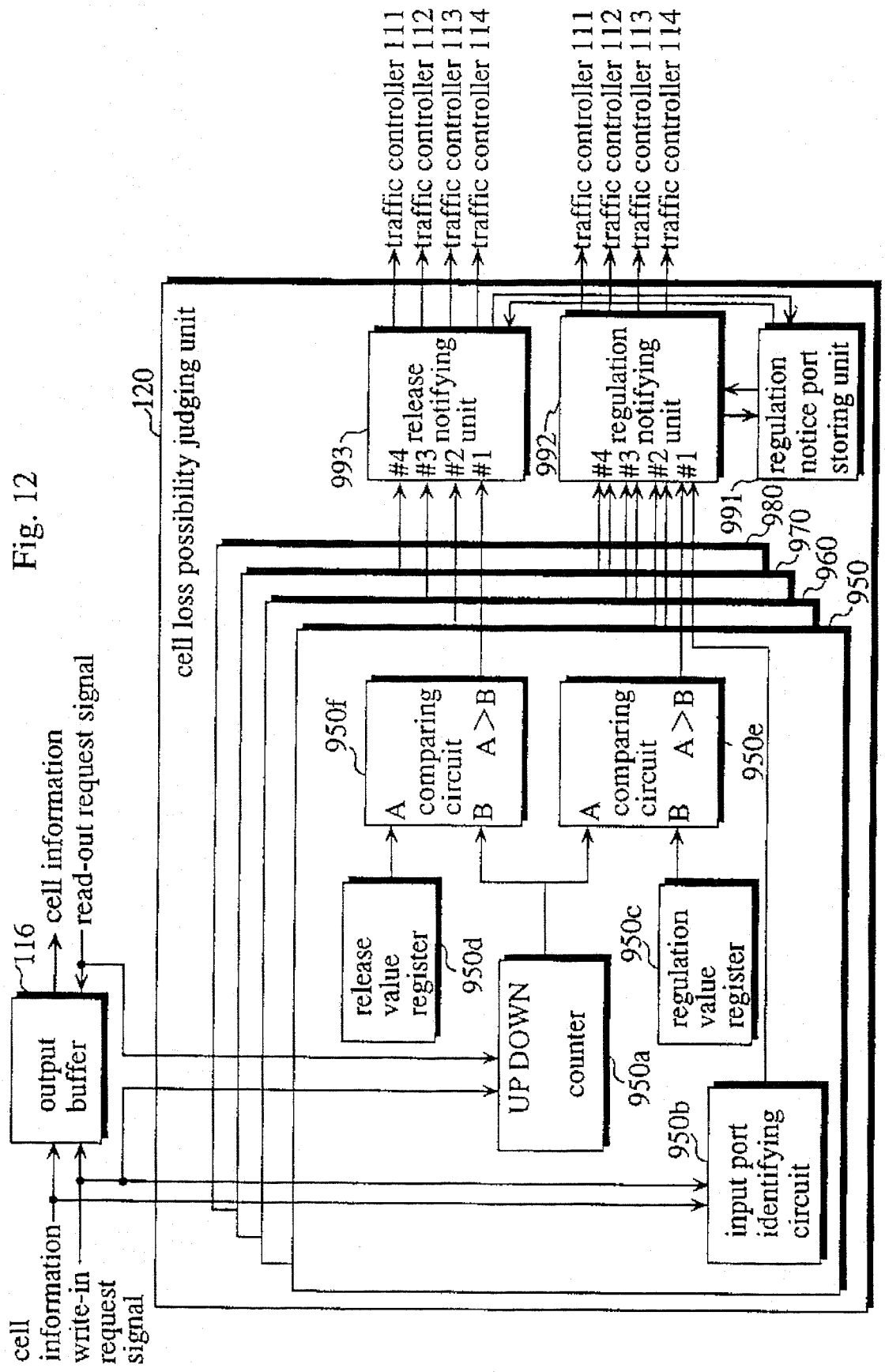
FIG. 12 is a block diagram depicting the detailed configuration of a cell loss possibility judging unit 120.

FIG. 12 is a block diagram depicting the detailed configuration of the cell loss possibility judging unit 120. The cell loss possibility judging unit 120 comprises buffer monitoring circuits 950–980, a regulation notice port storing unit 991, a regulation notifying unit 992, and a release notifying unit 993. The buffer monitoring circuits 950–980 correspond to the output buffers 116–119 respectively; each monitors the number of data in the respective output buffer. All of these monitoring circuits have the similar configuration, and the buffer monitoring circuit 950 is mainly discussed.

The buffer monitoring circuit 950 has a counter 950a, an input port identifying circuit 950b, a regulation value register 950c, a release value register 950d, a comparing circuit 950e, and a comparing circuit 950f.

When a write-in request is inputted from the switch 115 and data is written into the output buffer 116, the counter 950a changes its counting number by +1. When a read-out request is inputted from the traffic controller 111 and data is read out from the output buffer 116, the counter 950a changes its counting number by −1. Thereby, the number of data in the output buffer is always recognized.

Each time the switch 115 writes cell information into the output buffer 116, the input port identifying circuit 950b identifies which input port of the network device 110 inputted the cell carrying the cell information, then stores the identified input port. As shown in FIG. 9C, the timing at which the switch 115 writes data into the output buffer 116 corresponds to an input port of the network device 110 one-to-one. Therefore, the input port identification circuit 950b identifies an input port by detecting a write-in timing into the output buffer 116.

The regulation value register 950c holds a first threshold value from which cells flowing to the network device 110 is regulated.

The release value register 950d holds a second threshold value from which regulation to cells flowing to the network device 110 is released. For example, when the number of data which can be stored in the output buffer 116 is 160, the first threshold value is 80 and the second threshold value is 40.

The comparing circuit 950e compares a counting number at the counter 950a with a first threshold value held by the regulation value register 950c. When a counting number is larger than a first threshold value, the comparison circuit 950e activates a regulation signal.

The comparing circuit 950f compares a counting number at the counter 950a with a second threshold value held by the release value register 950d. When a counting number is smaller than a second threshold value, the comparing circuit 950f validates a release signal.

The regulation notice port storing unit 991 stores information which indicates if each input port of the network device 110 is currently regulated. If an input port is currently regulated, the regulation notice port storing unit 991 further stores information which indicates an output buffer which caused the current regulation. These information are set/reset by the regulation notifying unit 992 and the release notifying unit 993. FIG. 13 shows an example of the regulation notice port storing unit 991. In FIG. 13, the column of input port number shows all input port numbers of the network device 110; the column of regulation flag shows if the respective input port is regulated currently. The column of cause flag is provided for each output buffer, and indicates if the respective output buffer caused current regulation (cell abandonment is a possibility). For example, FIG. 13 shows that the input port #1 is regulated because of the output buffers #1 and #2 (output buffers 116, 117). The input port #2 is also regulated because of the output buffer #1. Neither the input port #3 nor #4 is regulated.

A regulation signal from the comparing circuit 950e in the buffer monitoring circuit 950 and an input port number from the input port identifying circuit 950b are inputted in pairs to an input terminal #1 of the regulation notifying unit 992. Similarly, regulation signals from the buffer monitoring circuits 960, 970, 980, and input port numbers are inputted in pairs to input terminals #2–#4 of the same respectively. The input terminals (#1–#3 in FIG. 13) correspond to the output buffers 116–119 respectively.

Figure 14:
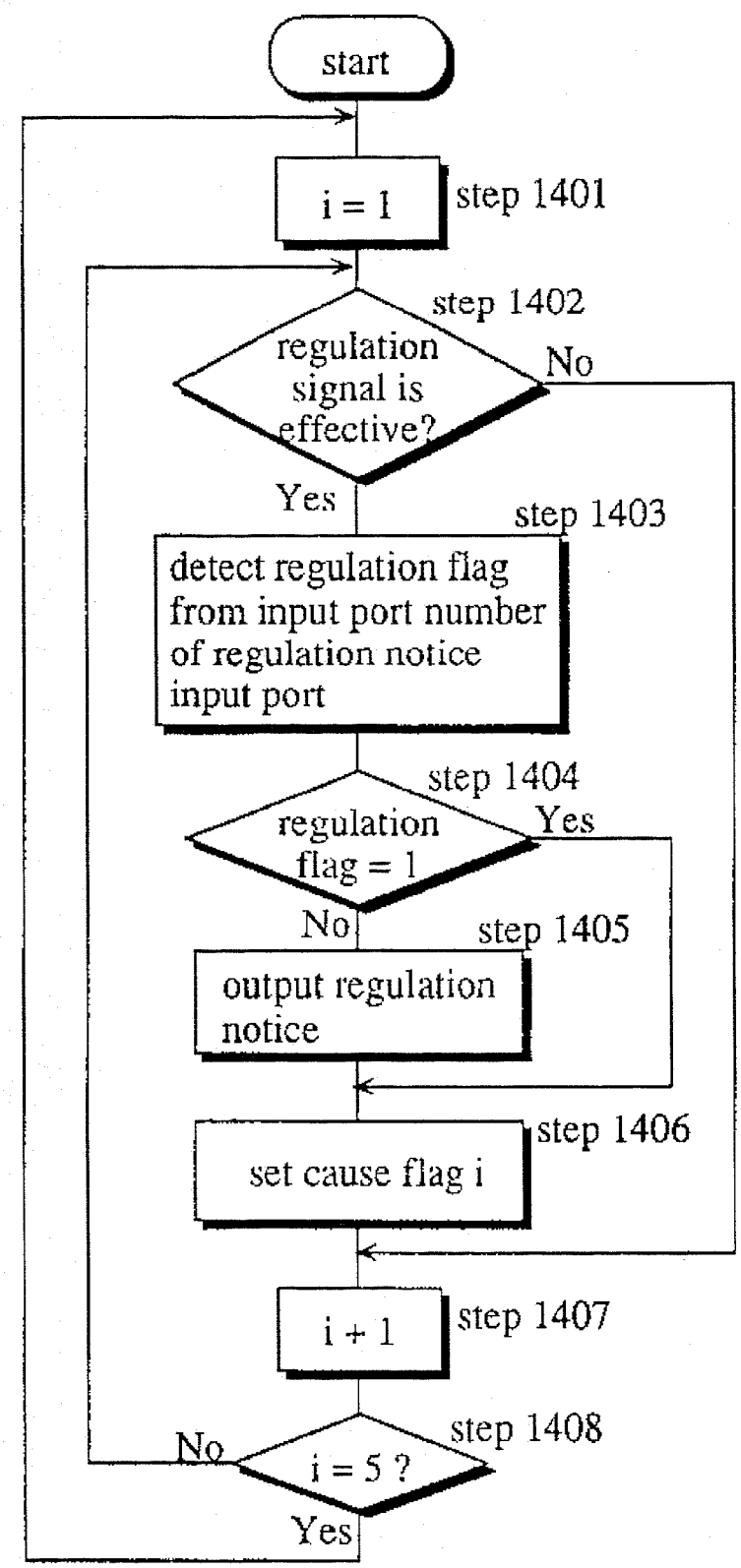
FIG. 14 is a flow chart describing the operation of a regulation notice circuit 992.

FIG. 14 is a flow chart showing the operation of the regulation notifying circuit 992. As shown in FIG. 14, when any of regulation signals is effective (Steps 1401, 1402), the regulation notifying circuit 992 examines if a regulation flag corresponding to the input port number in the same pair is set as referring to the regulation notice port storing unit 991 (Step 1403). If the regulation flag corresponding to the input port number is not set (Step 1404: No), the regulation notifying unit 992 outputs a regulation notice to the traffic controller corresponding to the input port number (Step 1405), and sets the cause flag as well (Step 1406). When a regulation flag corresponding to the input port number is set (Step 1404: Yes), the cause flag is set. These operations are applied to regulation signals for each of the input terminals #1–#4 (Steps 1401, 1407, and 1408). As a result, as shown in FIG. 13, one input port may be regulated because of a plurality of output buffers (input port #1 is regulated because of output buffers #1 and #2); or a plurality of input ports may be regulated because of one output buffer (input ports #1 and #2 are regulated because of output buffer #1).

A release signal from the comparing circuit 950*f* in the buffer monitoring circuit 950 is inputted to input terminal #1 of the release notifying unit 993; similarly, release signals from the buffer monitoring circuits 960, 970, 980 are inputted to input terminals #2–#4 of the release notifying unit 993 respectively. These input terminals #1–#4 correspond to output buffers #1–#4 respectively.

Figure 15:
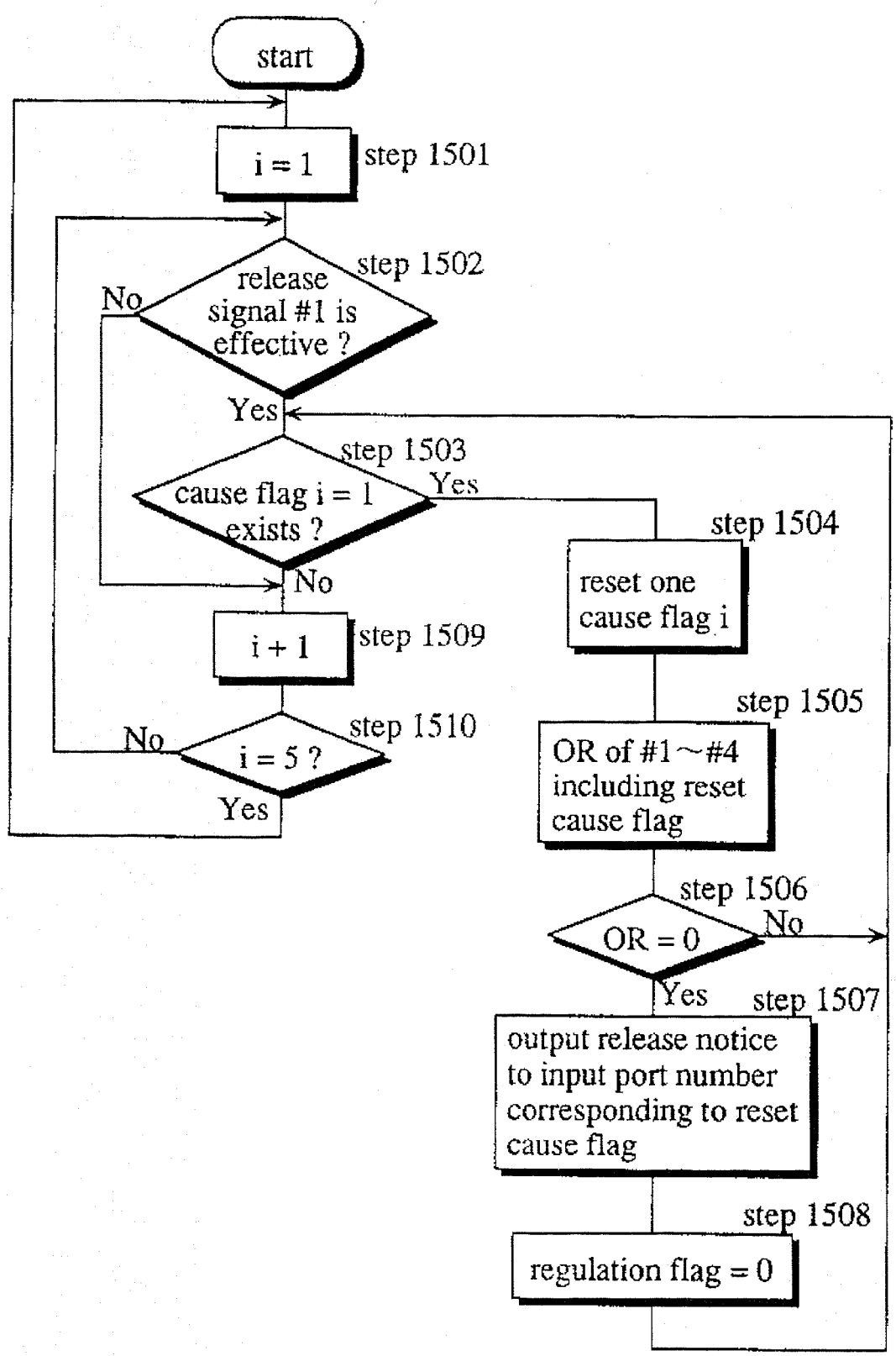
FIG. 15 is a flow chart describing the operation of a release notice circuit 993.

FIG. 15 is a flow chart depicting the operation of the release notifying circuit 993. When one of the release signals (#1) becomes effective(Step 1502), the release notifying circuit 993 examines if there is a cause flag #1 whose value is 1. If such cause flag(s) exists (Step 1503: yes), the release notifying circuit 993 resets one of the cause flags (if only one cause flag exists, it is reset) (Step 1504), the logical OR of cause flags #1–#4 which are on the same row as the reset cause flag is calculated (Step 1505). If the logical OR is 0 (Step 1506: yes), the release notifying circuit 993 provides a release notice to a traffic controller of the respective input port number (Step 1507), and resets the respective regulation flag (Step 1508). If the logical OR is not 0 (Step 1506: no), the release notifying unit 993 returns to Step 1503 and repeats the same operations until no cause flag #1=1 exits. Similarly, the above operations are applied to release signals #2–#4 (Steps 1501, 1509, 1510).

First and Second Threshold Values at Regulation Register and Release Register

Terms we will see below are explained. A transmissible cell number represents a maximum number of cells which can be transmitted between a user device receives a reset cell and it receives another reset cell. The total of transmissible cell numbers from user devices to an output buffer is Wtotal. The shortest time required for a traffic controller j to input a transmissible number of cells to the output buffer is Tj. The speed at which cells in the output buffer are reduced is V. Tjs are added from the biggest one in order unless the sum becomes greater than V. The total of transmissible cell numbers from traffic controllers is W when the sum of Tj which does not exceed V becomes the greatest.

A first threshold value is set as assuring that an output buffer has the remaining amount which is more than a value obtained by Wtotal-W.

The reason for this setting is described. When the number of cells stored in an output buffer reaches a first threshold value, traffic controllers for storing cells in the output buffer are informed to regulate the cell flowing. Accordingly, the informed traffic controllers stop sending a reset cell. Therefore, the number of cells which can be transmitted from traffic controllers to an output buffer is equal to the total of transmissible numbers from the traffic controllers at most. The number of cells which can be transmitted from a traffic controller k at most is Wk.

The total of Wk for traffic controllers which transmit cells to an output buffer is $W_{total}$. Stated otherwise, $W_{total}$ represents a maximum number of cells which can be stored in an output buffer when the number of cells stored in the output buffer has reached a first threshold value.

Cells are outputted from an output buffer. The speed at which cells are output from an output buffer is the same as the speed V at which cells in the output buffer are reduced. The number of cells in an output buffer increases when the speed at which cells are stored in the output buffer is faster than V, and decreases when it is slower than V.

The number of cells in an output buffer becomes maximum when cells are stored at an increasing speed until it reaches a maximum value. More specifically, the cell number becomes maximum when cells are stored at V speed or faster until it reaches Wtotal. Regardless the way for storing cells, a maximum number does not change.

The maximum number of cells which can be newly stored in an output buffer after a first threshold value has reached is obtained by Wtotal-W where W is the number of cells which are outputted from the output buffer. A first threshold value is determined to assure that the remaining buffer amount is larger than Wtotal-W.

Next, W is studied. As set forth above, how to store cells do not change the maximum number. For convenience of the description, it is assumed herein that every traffic controller transmits a maximum number of cells at a maximum speed.

When the sum of maximum transmission speeds for traffic controllers is smaller than V, at least the number of cells which corresponds to the total of transmissible cell numbers from the traffic controllers will be outputted from the output buffer.

Stated otherwise, if the shortest time required for a traffic controller j to input a transmissible number of cells to the output buffer is Tj, Tjs are added from the biggest one until the greatest Tj smaller than V is obtained. In this case, at least the number of cells which can be transmitted from traffic controllers in accordance with the biggest sum will be outputted from the output buffer, and W shows that number of cells. Therefore, to avoid cell abandonment, a first threshold value is set to assure that the buffer remaining amount is greater than Wtotal-W.

A second threshold value is greater than a first threshold value.

Description of Operation

For example, a cell transmitted from a user device 102 passes through the communication path 121, and enters the switch 151 via the traffic controller 111. The switch 115 in the network device 151 switches the cell. Accordingly, if an output port which is connected to a user device for which the cell is destined corresponds to the output buffer 117, the cell is outputted to the output buffer 117.

The traffic controllers 111–114 have the capability of transmitting a cell which directs a reset. Therefore, the traffic controllers 111–114 work together with user devices to control the number of cells to be transmitted from a plurality of user devices to a communication paths. Accordingly, cell transmissions remain fair to users. This control is discussed in great detail hereinafter.

Detecting a reset cell (RST bit=ON), a cell number which is set to a window counter beforehand is provided to a user device. Accordingly, the user device can transmit cells up to the provided cell number before receiving another reset cell.

A traffic controller transmits a reset cell (1) when no user device can transmit a cell or no data to be transmitted exists. Otherwise, a traffic controller transmits reset cells at definite intervals (2) upon each time-out at a reset timer. Transmission of reset cells is controlled according to a regulation notice and a regulation release notice from the cell loss possibility judging unit 120.

The cell loss possibility judging unit 120 interrogates the number of data in each output buffer, and when it exceeds a first threshold value, it judges that cell abandonment is likely to occur and provides a regulation notice to a traffic controller which transmit a cell after a first threshold value has been reached. Later, the cell loss possibility judging unit 120 provides a regulation release notice to the traffic controller if the number of data in the output buffer decreases to be smaller than a second threshold value.

Receiving a regulation notice, a traffic controller regulates transmission of reset cells. More specifically, the traffic controller stops the above (1) reset transmission and reduces the frequency of the (2) reset transmission. As for (2), when receiving a regulation notice, a timer users a second initial value instead of a first initial value. Therefore, if a reset cycle set by a second initial value is two times longer than usual, the cell amount from a user device per a time unit is reduced into one-half. Similarly, if a reset cycle set by a second initial value is three times longer than usual, the cell amount from a user device per a time unit is reduced into one-third.

Thus, the cell amount from a user device can be regulated. Therefore, even when it is judged that cells from an output buffer are likely to be abandoned, this will be solved in time (cell abandonment possibility is eliminated). Then, once the number of data in an output buffer becomes smaller than a second threshold value, the cell loss possibility judging unit 120 provides a regulation release notice to a traffic controller which has been under regulation, and the traffic controller resumes usual operation.

Therefore, in this embodiment, overflow of output buffers and abandonment of cells can be avoided. Further, since output buffers can be monitored by hardware, a control delay which could be generated between monitoring of an output buffer and transmission of a reset cell can be shortened.

Also, by setting the total of transmissible cells from a plurality of user devices which share a traffic destined for a single output buffer to be smaller than the speed at which cells in the output buffer are reduced, cell abandonment can be avoided with minimum regulation.

Even when an output buffer has the possibilities of overflow and cell abandonment, a rest cycle at a timer is set which still enables transmission of cells to the extent that this does not effect solutions for overflow and cell abandonment. Accordingly, cell abandonment and overflow can be avoided as assuring certain amount of data transmission capacity.

Embodiment 2

A system in a second embodiment is substantially the same as the system in FIG. 1 except that the configurations of a traffic controller and a user device are partly different. Mainly different components are described hereafter.

Figure 16:
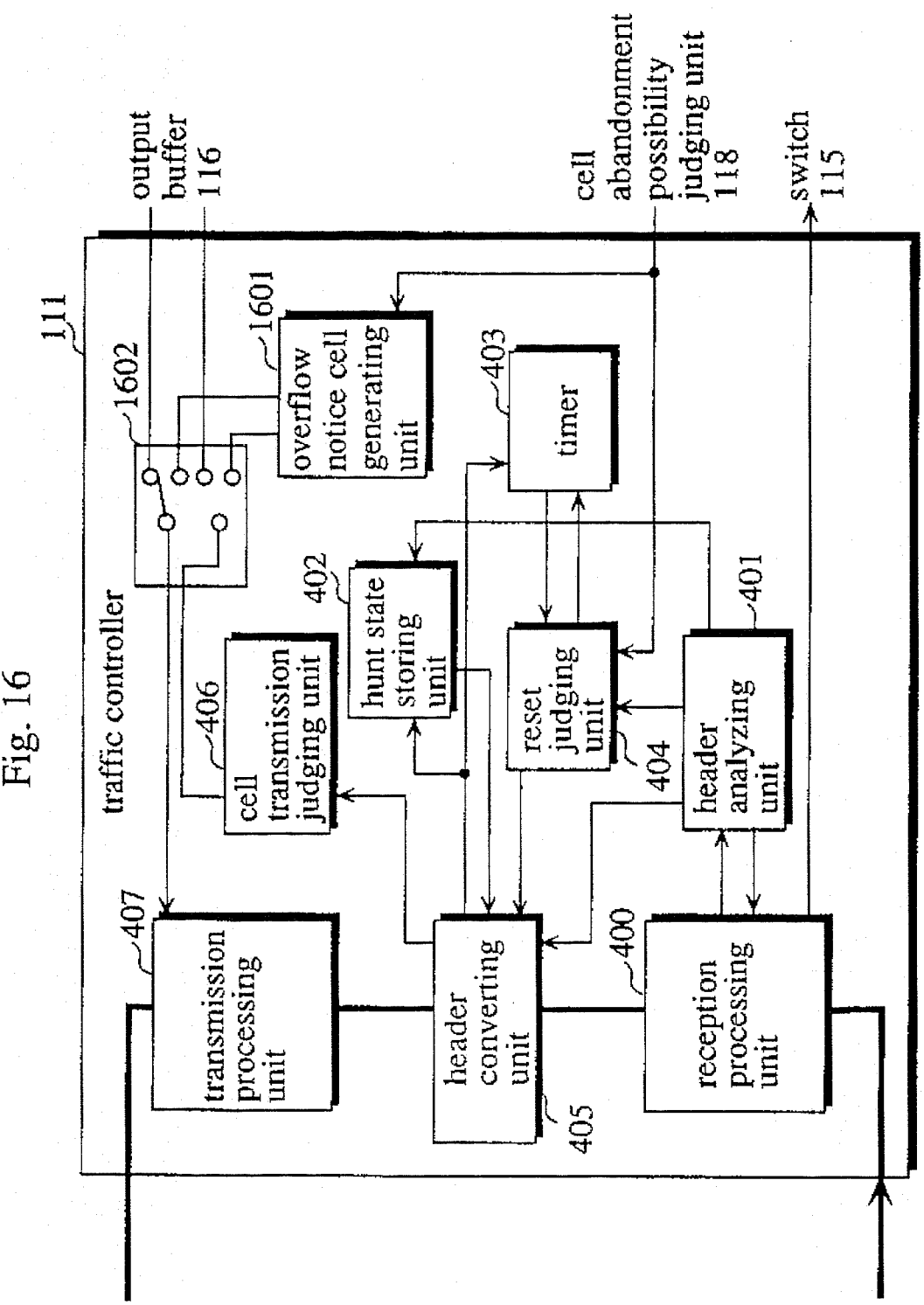
FIG. 16 is a block diagram depicting the configuration of a traffic controller in a second embodiment.

FIG. 16 is a block diagram depicting the configuration of a traffic controller. The traffic controller in FIG. 16 is substantially same as that is FIG. 6 except that an overflow notice cell generating unit 1601 and a selecting unit 1602 are added.

The overflow notice cell generating unit 1601 generates an overflow notice cell which indicates a high possibility for overflow of an output buffer, and a release notice cell which indicates that possibility for overflow of the output buffer is not high any longer. According to a regulation notice and a release notice from the cell loss possibility judging unit 120, the overflow notice cell generating unit 1601 controls a selecting unit 1602.

The selecting unit 1602 selects either the output buffer 116 or the overflow notice cell generating unit 1601 and outputs a cell to the transmission processing unit 407. Also, the selecting unit 1602 sends a read-out request signal from the timer 403 either to the output buffer 116 and the overflow notice cell generating unit 1601 selectively. More specifically, the selecting unit 1602 usually outputs a read-out request signal to the output buffer 116 and selects data from the output buffer 116. When receiving a regulation notice from the cell loss possibility judging unit 120, however, the selecting unit 1602 transmits an overflow notice cell from the overflow notice cell generating unit 1601 instead of a cell from the output buffer 116. Then, when receiving a release notice, the selecting unit 1602 transmits a release notice cell instead of a cell from the output buffer 116. An overflow notice cell and a release notice cell are realized being based on a management cell for a ring network [OAM (Operation And Maintenance) cell]. Actually, a management cell is generated at an application layer level.

Figure 17:
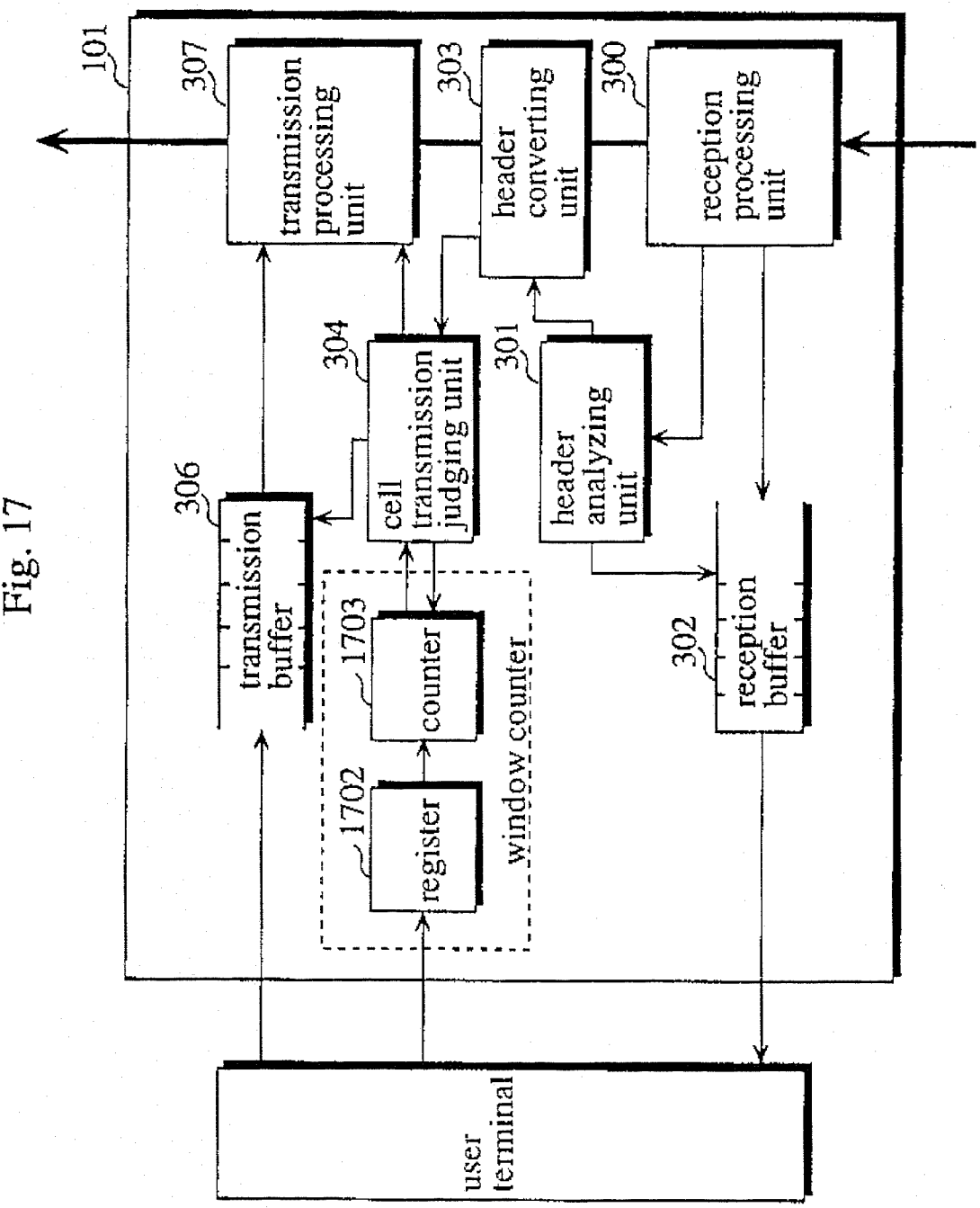
FIG. 17 is a block diagram depicting the configuration of a user device in the second embodiment.

FIG. 17 is a block diagram depicting the configuration of a user device. The user device in FIG. 17 is substantially the same as the user device in FIG. 3 except that the window counter 305 is replaced with a window counter 1701 which includes a register 1702 and a counter 1703.

The register 1702 holds an initial value for a window inputted from a user terminal. Usually, a predetermined value is stored in the register. When a user device receives an overflow notice cell, what is smaller than a usual value is stored. Then, when a user device receives a release notice cell, a usual value resumes. A user terminal stores a value in the register 1702.

The counter 1703 counts from an initial value stored in the register 1702 to 0 as changing its counting number by −1 upon each use of a cell. An initial value is loaded from the register 1702 upon each reset of the counter 1703.

Description of Operation

The operation of the thus constructed flow control device is described.

Similarly to the first embodiment, the cell loss possibility judging unit 120 issues a regulation notice and a release notice to a traffic controller. When a regulation notice is issued, a traffic controller regulates transmission of reset cells as set forth in the first embodiment; besides, it transmits an overflow notice cell generated by the overflow notice cell generating unit 1601 to the ring network via the selecting unit 1602 and the transmission processing unit 407.

Since an overflow notice cell received by a user device is based on an OAM cell, it is received as data stored in payload of a cell is received. More specifically, the content of an overflow notice cell is informed to an user terminal via the reception processing unit 300 and the reception buffer 302. The user terminal analyzes the received overflow notice cell, and changes an initial value stored in the register 1702 to a predetermined one which is smaller than a usual one. Accordingly, when a reset cell is received, the counter 1703 is reset and the new initial value is set. The newly set initial value is smaller than an usual one, and this helps to alleviate a high possibility for overflow effectively.

Then, when the cell loss possibility judging unit 120 issues a release notice, the traffic controller releases the regulation as set forth in the first embodiment; besides, the cell loss possibility judging unit 120 transmits a release notice cell generated by the overflow notice cell generating unit 1601 to the ring network via the selecting unit 1602 and the transmission processing unit 407.

As set forth in the above, a release notice cell received by a user device is sent to a user terminal. Accordingly, the user terminal returns an initial value for its window counter which is stored in the register 1702 for to a usual value. Consequently, ordinary operations resume.

Thus, by setting an initial value for a window counter, the transmission amount of occupied cells can be regulated more precisely, whereby more effective flow control is realized.

An initial value may be determined by a user device beforehand, or a traffic controller may include an initial value into an overflow notice cell.

It is predicted that overflow state (high possibility) is solved gradually, so that it may be solved by the followings:

(1) gradually shortening the cycle for a traffic controller to generate a reset cell;

(2) gradually returning an initial value for a window counter in a user device to a usual one; or (3) operating the combination of (1) and (2).

Accordingly, an overflow state can be changed into a usual state smoothly; therefore, more efficient data communication is achieved.

Embodiment 3

A system in a third embodiment is substantially the same as the system in FIG. 1 except that the configurations of a traffic controller and a user device are partly different, as well as bits are assigned to a GFC field of a cell differently. Differences are mainly discussed hereafter.

Figure 18:
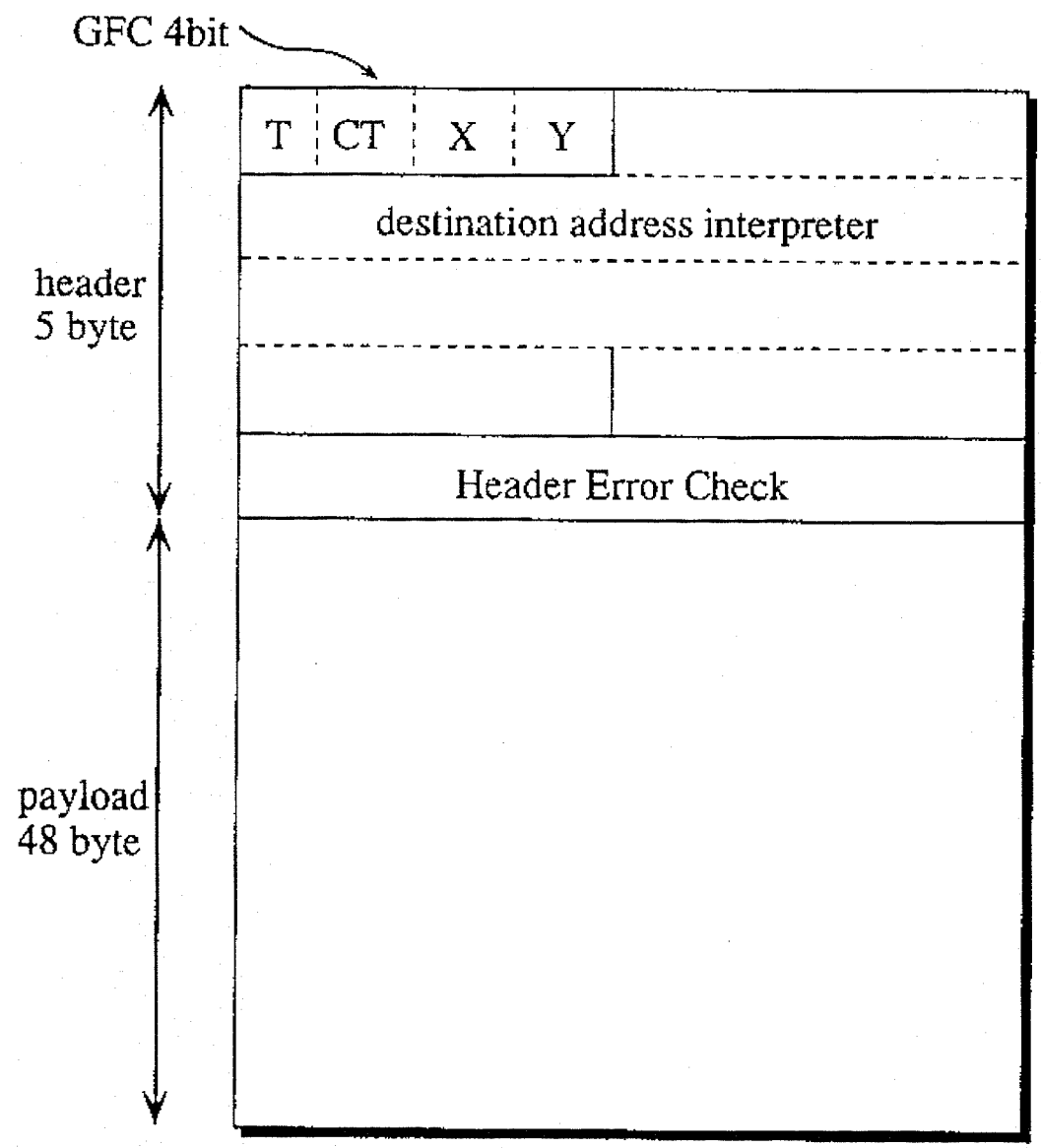
FIG. 18 shows the format of a cell in a third embodiment.

FIG. 18 shows the format of a cell in the third embodiment. The format in FIG. 18 is different from that relating to the first embodiment in the way bits are assigned to a GFC field.

T bit is the same as that in the first embodiment.

State bit (CT) is the same as that in the first embodiment.

X bit and Y bit in pairs are called reset direction bits. A combination of X bit and Y bit indicates a reset cell, and its mode. FIG. 19 shows combinations of X bit and Y bit, and interpretation of each combination.

X, Y=ON, ON (free mode) directs a user device to reset the window counter; also this free mode indicates that ordinary transmission is possible. When receiving free mode direction, a user device resets the window counter. Further, the received free mode direction enables a user device to transmit cells to the network device and another user device.

X, Y=ON, OFF (NT(NetWork) regulation mode) directs a user device to reset the window counter, and to regulate transmission of cells to the network device. When receiving NT regulation mode direction, a user device resets the window counter. Further, the received NT regulation mode prohibits transmission of cells from a user device to the network device.

X, Y=OFF, don't care, indicates that it is not a reset cell.

Figure 20:
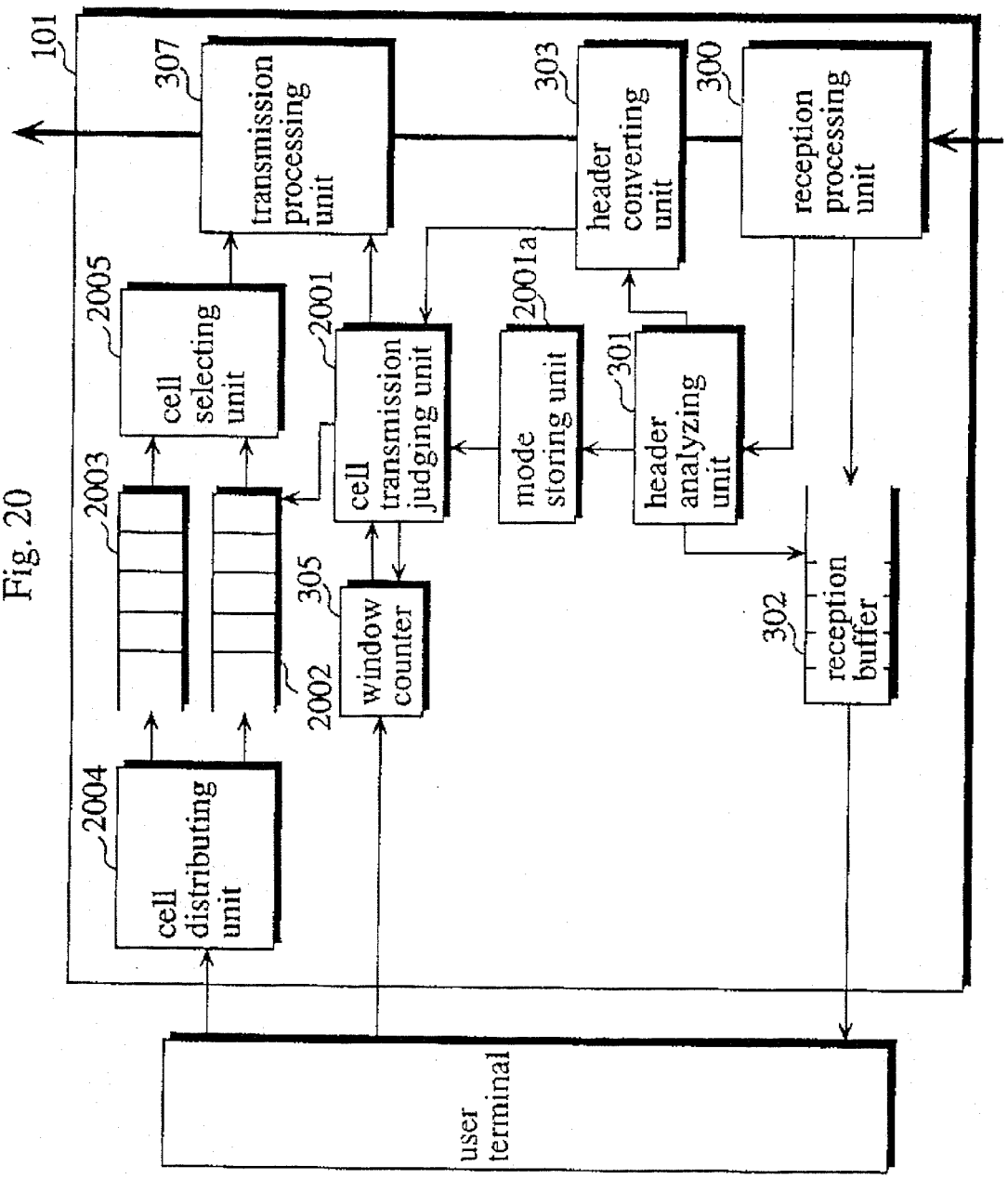
FIG. 20 is a block diagram depicting the configuration of a user device in the third embodiment.

FIG. 20 is a block diagram depicting the configuration of a user device. The user device in FIG. 20 is substantially the same as the user device in FIG. 3 except that the window transmission buffer 306 is replaced with transmission buffers 2002 and 2003; and a mode storing unit 2001a, a cell distributing unit 2004, and a cell selecting unit 2005 are added.

When the analyzing result from the header analyzing unit 301 directs a reset (X=ON), the mode storing unit 2001a stores a directed mode (free mode if Y=ON, NT regulation mode if Y=OFF).

The transmission buffers 2002 and 2003 store data destined for a user device, and a network device respectively.

The cell distributing unit 2004 distributes data from a user terminal to the transmission buffer 2002 if it is destined for a user device, and distributes data from the same to the transmission buffer 2003 if it is destined for the network device.

According to a direction from the cell transmission judging unit 304, the cell selecting unit 2005 selects data from either of the transmission buffers.

According to a mode stored in the mode storing unit 2001a, the cell transmission judging unit 2001 decides if cells can be transmitted. As for a free mode, the cell transmission judging unit 2001 operates like the cell transmission judging unit 304 in the first embodiment. As for an NT regulation mode, it operates differently.

FIG. 21 shows transition between states of a cell by the cell transmission judging unit 2001. As shown in FIG. 21, as for free mode, if an input cell is available (CT=OFF), the cell selecting unit 2005 selects data destined for a user device in the transmission buffer 2002 and data destined for the network device in the transmission buffer 2003 in a predetermined order (for example, in the order that these data are inputted to the cell distributing unit 2004). Then, selected data is loaded on the input cell; automatically it is changed into an occupied cell. The cell carrying the selected data is then transmitted via the transmission processing unit 307. Both data destined for a user device and data destined for the network device can be transmitted by a free mode.

As for an NT regulation mode, if an input cell is available, the cell selecting unit 2005 selects only data destined for a user device in the transmission buffer 2002. Then, selected data is loaded on the input cell; automatically it is changed into an occupied cell. The cell carrying the selected data is then transmitted via the transmission processing unit 307. No data destined for the network device in the transmission buffer 2003 is transmitted by an NT regulation mode.

Figure 22:
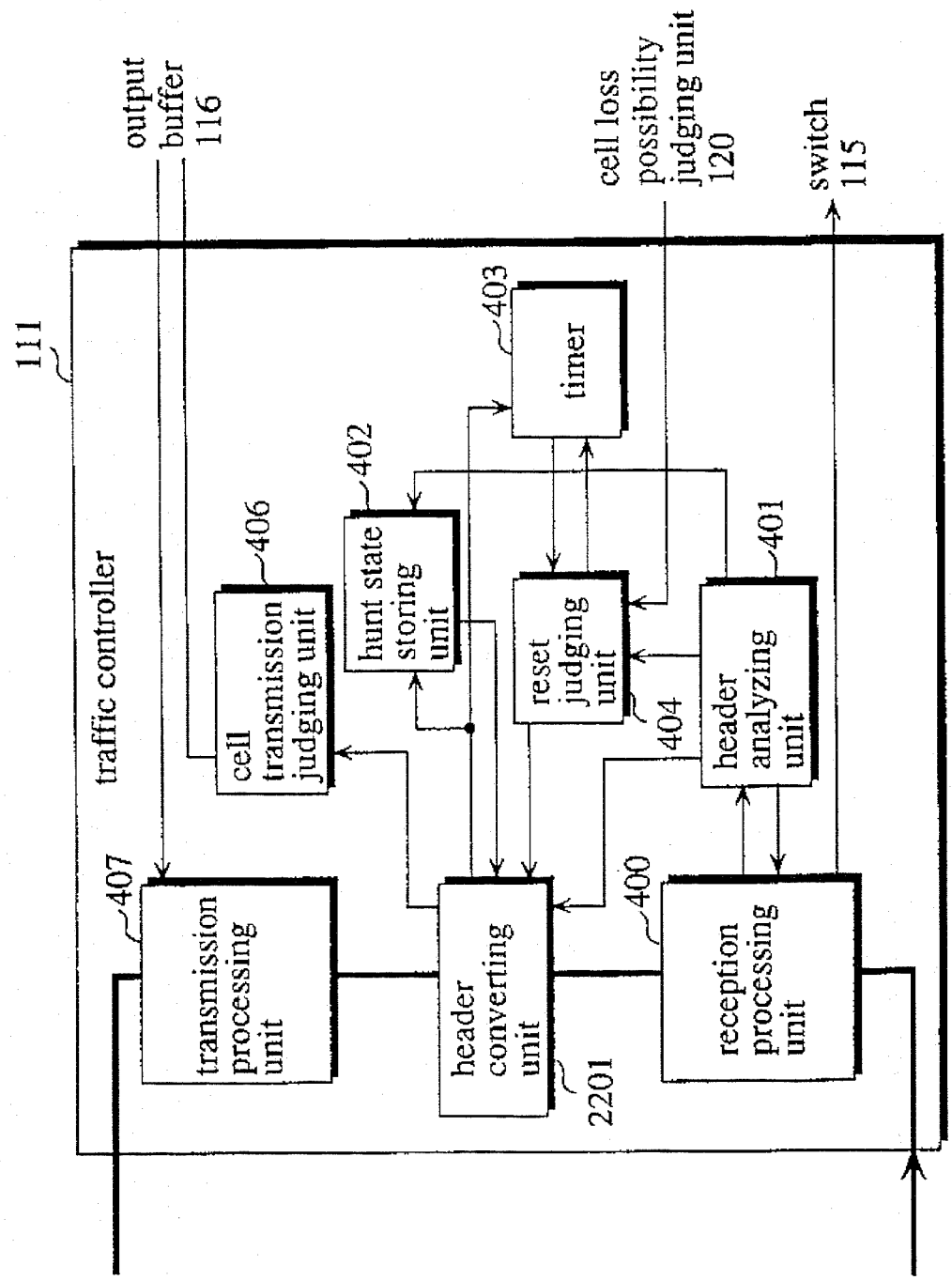
FIG. 22 is a block diagram depicting the configuration of a traffic controller in the third embodiment.

FIG. 22 is a block diagram depicting the configuration of a traffic controller. The traffic controller in FIG. 22 is substantially the same as that in FIG. 6 except that the header converting unit 402 is replaced with a header converting unit 2201.

The header converting unit 2201 operates substantially the same as the header converting unit 402 except for the processing of a reset direction bit (Xbit, Ybit). FIG. 23 shows transition between states of a cell by the header converting unit 2201, and only differences between FIG. 23 and FIG. 7 for the header converting unit 405 are discussed.

When T bit=ON, X and Y bits of a reset direction are set to ON (X=ON, Y=ON) if the hunt state storing unit 404 is not in hunt state, and the reset judging unit 405 does not show regulation state.

When X bit=ON, it is set to OFF (X bit=OFF). Accordingly, the header converting unit 2201 releases hunt state in the hunt state storing unit 402 (the second FF is reset).

When X bit=OFF, X and Y bits are set to ON (X bit=ON, Y bit=ON) if a reset transmission direction from the reset judging unit 405 is effective and the reset judging unit 404 does not show regulation state. Accordingly, a reset cell in free mode is transmitted. The header converting unit 2201 sets hunt state and re-starts the timer 403.

When X bit=OFF, X bit is set to ON and Y bit is set to OFF (X bit=ON, Y bit=OFF) if a reset transmission direction from the reset judging unit 405 is effective and the reset judging unit 404 shows regulation state. Accordingly, a reset cell in NT regulation mode is transmitted. The header converting unit 2201 sets hunt state and re-starts the timer 403.

When X bit=OFF, it is not changed if a reset transmission direction from the reset judging unit 405 is not effective (Y bit also remains the same).

Description of Operation

The operation of the thus constructed flow control device is described. This embodiment is different from the first embodiment in that a traffic controller uses a reset cell in free mode or a reset cell in NT regulation mode depending on each situation.

In ordinary situations, that is when the cell loss possibility judging unit 120 does not issue a regulation notice, the traffic controller 111 outputs a reset cell in free mode upon each time-out by the timer 403. When receiving a cell whose Tbit=ON neither in hunt state nor regulation state, the traffic controller 111 outputs a reset cell in free mode.

Because of a reset cell in free mode, a user device resets the window counter. In this case, a user device can transmit both cells destined for another user device and cells destined for the network device.

When the cell loss possibility judging unit 120 issues a regulation notice, the traffic controller 111 outputs a reset cell in NT regulation mode upon each time-out by the timer 403.

Because of a reset cell in NT regulation mode, a user device can transmit only cells destined for another user device, and it cannot transmit cells destined for the network device. Accordingly, no cells are transmitted from a user device to the network device; therefore, overflow state (possibility) of the network device is eliminated.

Later, when the cell loss possibility judging unit 120 issues a release notice, the traffic controller 111 starts to output reset cells in free mode again.

Thus, in this embodiment, only transmission of cells to a network device is regulated, and transmission of cells to a user device is not regulated. Therefore, cell transmission can be operated between user devices without interfering with the process of solving overflow state.

Embodiment 4

A system in a fourth embodiment is substantially the same as the system in FIG. 1. The fourth embodiment is substantially the same as the third embodiment except that the configuration of a user device is partly different, and reset direction bits are assigned to a GFC field of a cell differently. Differences are mainly discussed hereafter.

The cell format and bit assignment to a GFC field are substantially same as those in the third embodiment except that a reset direction (Xbit, Ybit) is interpreted differently. FIG. 24 shows combinations of X bit and Y bit, and interpretation of each combination.

A free mode (X, Y=ON, ON) and an NT(Network) regulation mode (X, Y=ON, OFF) are the same as those relating to the third embodiment.

X, Y=OFF, ON represents a TE (Terminal Equipment) regulation mode. This mode directs a user device to reset the window counter; also this TE regulation mode directs to regulate transmission of cells destined for another user device. When receiving a TE mode, a user device resets the window counter. Further, the received TE mode enables a user device to transmit only cells destined for the network device. Only this TE mode is set by a user device.

Figure 25:
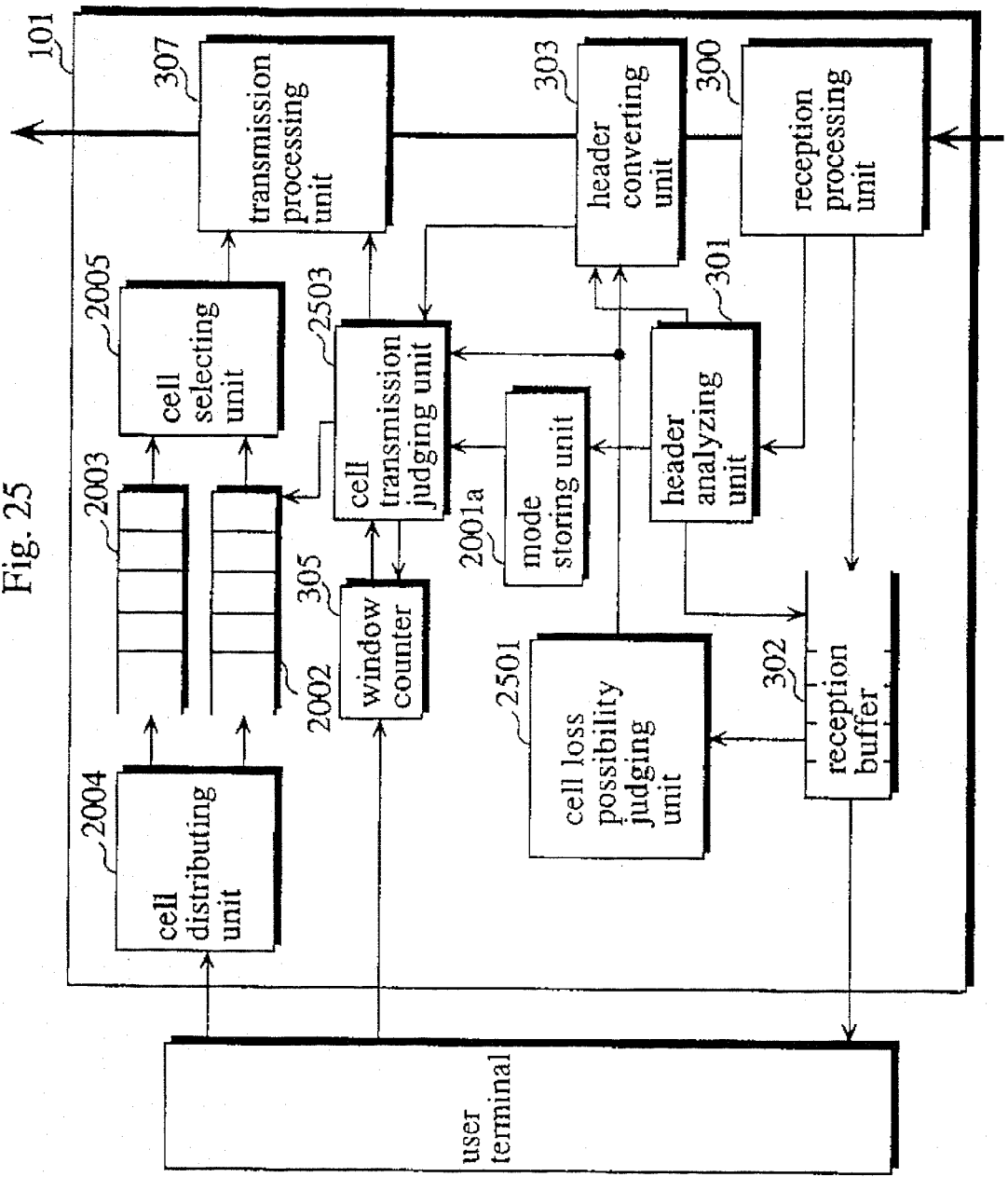
FIG. 25 shows the configuration of a user device in the fourth embodiment.

X, Y=OFF, OFF indicates that it is not a reset cell. FIG. 25 is a block diagram depicting the configuration of a user device. The user device in FIG. 25 is substantially the same as the user device relating to the third embodiment except that a cell loss possibility judging unit 2501 is newly added, and a header converting unit 2502 and a cell transmission judging unit 2503 replace the header converting unit 303 and the cell transmission judging unit 2001 respectively.

The cell loss possibility judging unit 2501 is substantially the same as the cell loss possibility judging unit 120 in the first embodiment. That is, the cell loss possibility judging unit 2501 judges if cell abandonment (overflow) is likely to occur. When the cell loss possibility judging unit 2501 judges that cell abandonment is likely to occur, it provides a regulation notice to the header converting unit 2502 which indicates that cell input from another user device must be regulated. Later, when the cell loss possibility judging unit 2501 judges that cell abandonment is not likely to occur any longer, it provides a regulation release notice to the header converting unit 2502. The detailed configuration of the header converting unit 2502 is the same as a part of FIG. 12 comprising the buffer monitoring circuit 950, the regulation notice port storing unit 991, the regulation notifying unit 992, and the release notifying unit 993, and the description of these components is not repeated.

In addition to the function of the header converting unit 303 in the first embodiment, the header converting unit 2502 has the following functions. When receiving a regulation notice from the cell loss possibility judging unit 2501 and a reset cell from the reception processing unit 300, the header converting unit 2502 converts the received reset cell into a reset cell in TE regulation mode. When receiving a release notice from the same, the header converting unit 2502 stops converting a received reset cell into a reset cell in TE regulation mode. Accordingly, transmission of cells from another user device is regulated.

FIG. 26 shows transition between states of input and output cells by the header converting unit 2502. FIG. 26 is different from FIG. 4 showing transition by the header converting unit 303 in that conversion of X bit is included. When an input cell has X bit=ON and it is in regulation state (a regulation notice from the cell loss possibility judging unit 2501 is effective), the header converting unit 2502 converts the X bit=OFF. On the other hand, when an input cell has X bit=ON but it is not in regulation state (a regulation notice from the cell loss possibility judging unit 2501 is not effective, or a release notice is provided), the header converting unit 2502 does not convert the X bit. Stated otherwise, when its own reception buffer is likely to overflow (high possibility) and a reset cell in free mode is received, the header converting unit 2502 converts the reset cell into TE regulation mode (X, Y=ON, ON→OFF, ON). When a reset cell in NT regulation mode is received, the header converting unit 2502 converts it into a cell other than a reset cell (X, Y=OFF, ON→OFF, OFF). Accordingly, when a user device is likely to overflow, it can change another user devices into a TE regulation mode. As a result, cells flowing to itself are regulated.

Receiving the analyzing result from the header analyzing unit 301, the mode storing unit 2001a stores two bits, X andY of a reset direction.

The cell transmission judging unit 2503 has the following function besides the function of the cell transmission judging unit 2001 relating to the third embodiment. When X, Y bits in the mode storing unit 2001a represent a TE regulation mode, the cell transmission judging unit 2503 enables only transmission of cells to the network device, and prohibits transmission of cells to a user device.

FIG. 27 shows transition between states of a cell by the cell transmission judging unit 2503. FIG. 27 is different from FIG. 21 which shows transition by the cell transmission judging unit 2001 in that the column of TE regulation mode is included. When a cell in TE regulation mode is inputted from the head converting unit 2502 and the window counter 305 is other than 0 (C>0), the cell transmission judging unit 2503 transmits data destined for the network device (N2>0) if it is stored in the transmission buffer 2003 from the transmission processing unit 307. However, it does not transmit any data destined for a user device in the transmission buffer 2002 (N1>0) even if it exists.

Description of Operation

The operation of the thus constructed flow control device is described. The following operations are added to the operations relating to the third embodiment.

When a reception buffer in a user device is likely to overflow, the cell loss possibility judging unit 2501 provides a regulation notice to the header converting unit 2502 and the cell transmission judging unit 2503. Upon each reception of a reset cell, the cell transmission judging unit 2503 converts the received reset cell into a reset cell in TE regulation mode if the received reset cell is in free mode, or converts it into a cell other than a reset cell if it is in NT regulation mode.

When receiving a reset cell in TE regulation mode, a user device can transmit cells destined for the network device, but cannot transmit cells destined for another user device. Therefore, cells flowing to a user device which is likely to overflow are reduced; and the danger of overflow is alleviated.

As set forth above, a reset cell in NT regulation mode is converted into a cell which does not direct reset; therefore, a user device cannot transmit any cell (neither cells destined for the network device nor cells destined for a user device) once the window counter becomes 0. As a result, the danger of overflow is alleviated in time. Later, ordinary situation resumes upon reception of a reset cell.

Thus, according to the flow control device in this embodiment, a reset cell in TE regulation mode is transmitted when a user device is likely to overflow; accordingly, transmission of a reset cell from another user device is prohibited. Consequently, overflow of a user device which would be caused by cells flowing from another user device can be overcome.

When a network device is likely to overflow, transmission of cells flowing to the network device is regulated (NT regulation mode). Accordingly, each user device transmits a fewer number of cells upon each reset; therefore, a reset cycle is shortened. However, the number of cells transmitted from a user device to another user device remains unchanged. If a reset cycle is shortened, throughput of cells will be raised. Consequently, a user device for receiving cells is likely to overflow. Therefore, by regulating not only cells from a user device to the network device, but also cells from a user device to another user device, overflow state of a user device is overcome together with overflow state of the network device.

Transmission intervals for reset direction cells during overflow state may be controlled as follows. When receiving a rest cell, a user device changes an initial value for the window counter according to the mode of the reset cell. Thus, by varying an initial value, instability in throughput due to different reset cycles can be solved.

Embodiment 5

A system in a fifth embodiment is substantially the same as the system in FIG. 1. The fifth embodiment is substantially the same as the first embodiment except that a GFC field of a cell is partly different and the configurations of a traffic controller and a user device are partly different. Differences are mainly discussed hereafter.

Figure 28:
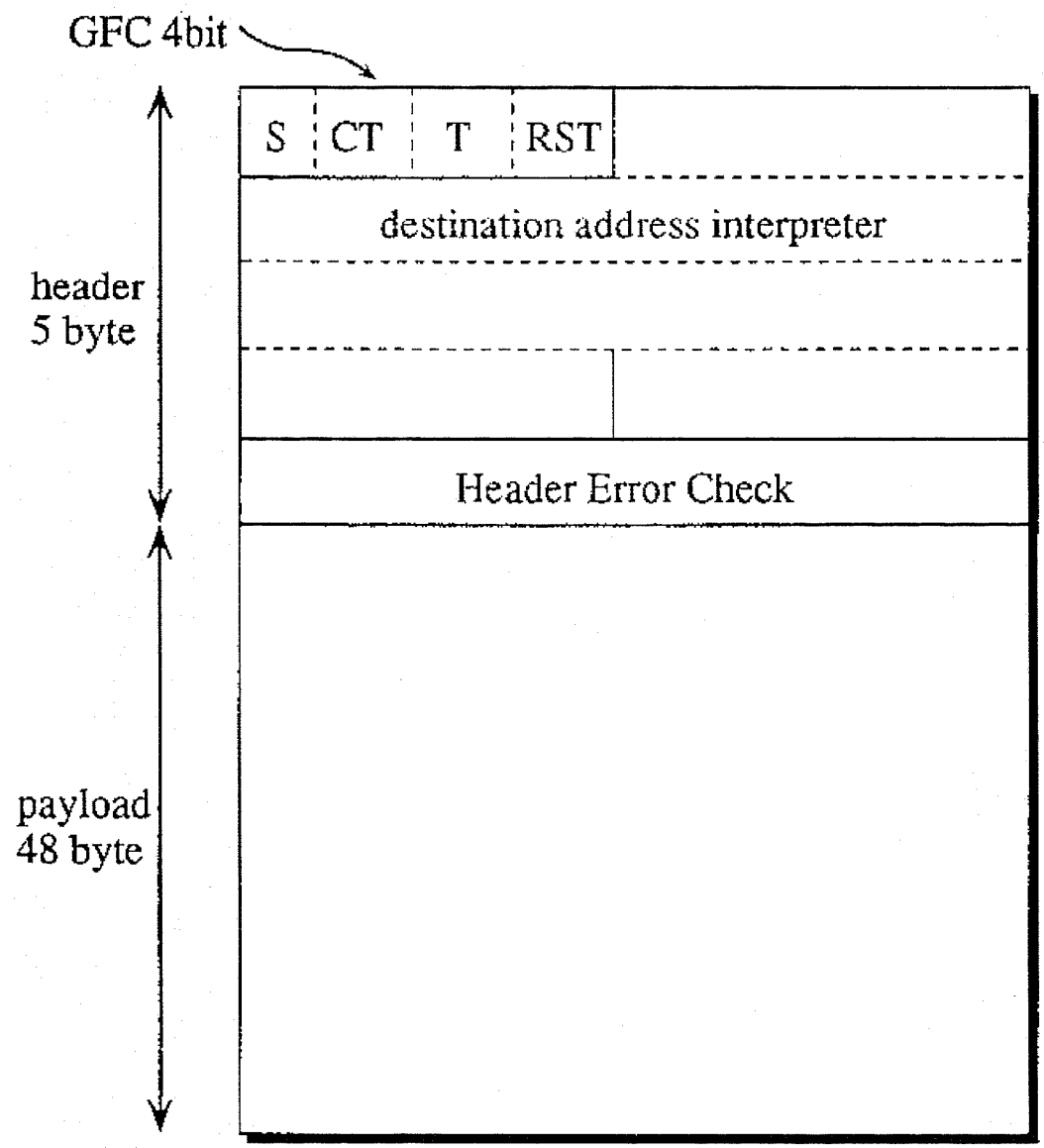
FIG. 28 shows the format of a cell in a fifth embodiment.

FIG. 28 shows the format of a cell. In FIG. 28, CT bit, Tbit, and RST bit are the same as those relating to the first embodiment.

S bit—When this S=ON, a user device can transmit a cell carrying data destined for the network device. When S=OFF, a user device cannot transmit a cell carrying data destined for the network device. This S bit is set/reset by a network device depending on if it is in usual state or it is in overflow state.

Figure 29:
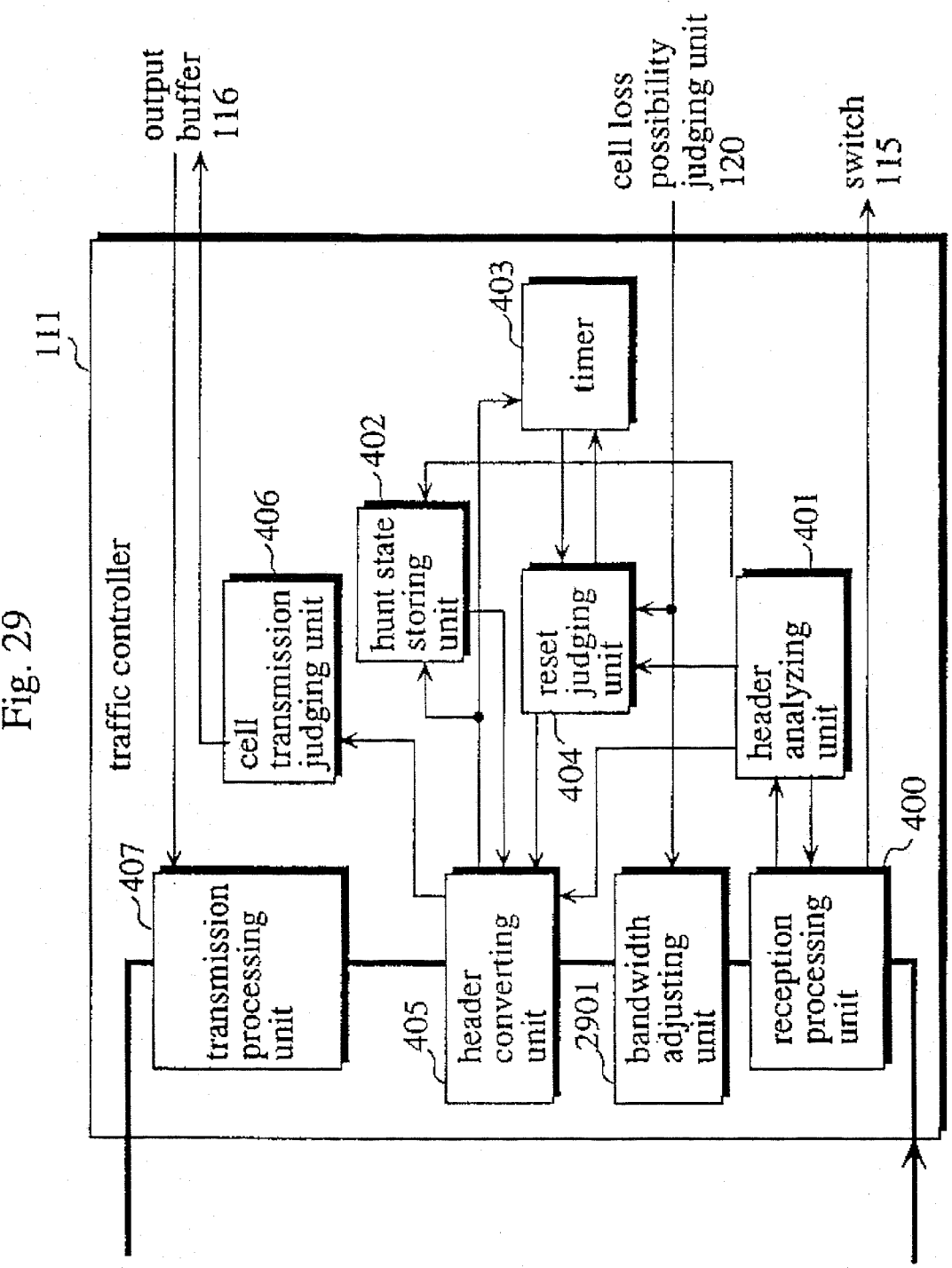
FIG. 29 is a block diagram depicting the configuration of a traffic controller in the fifth embodiment.

FIG. 29 is a block diagram depicting the configuration of a traffic controller. The traffic controller in FIG. 29 is different from that relating to the first embodiment (FIG. 6) only in that a bandwidth adjusting unit 2901 is included.

The bandwidth adjusting unit 2901 sets/resets an S bit of a cell inputted by the reception processing unit 400 in accordance with a regulation notice/release notice from the cell loss possibility judging unit 120 at predetermined rate. More specifically, if a regulation notice from the cell loss possibility judging unit 120 is not effective, the bandwidth adjusting unit 2901 sets S bit=ON at a rate which corresponds to bandwidth of output ports of the network device representing the number of cells which can be transmitted per a time unit (for example, 100 cells out of 1000 cells transmitted per a time unit). When a regulation notice is not effective, S bit is set to ON at a lower rate. For convenience of the description, S bit of every cell is set to OFF when a regulation notice is effective herein.

Figure 30:
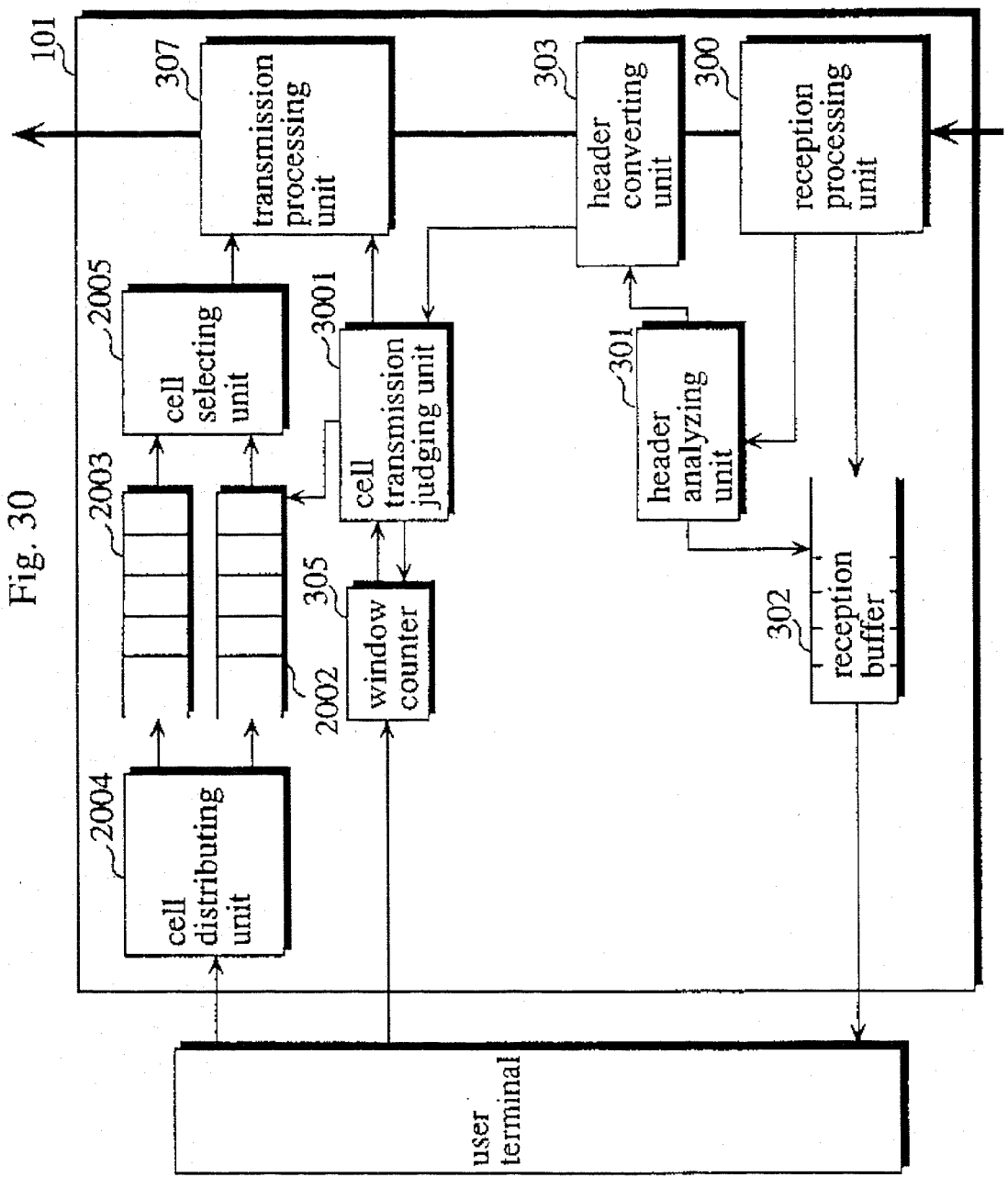
FIG. 30 is a block diagram depicting the configuration of a user device in the fifth embodiment.

FIG. 30 is a block diagram depicting the configuration of a user device. The user device in FIG. 30 is substantially same as the user device relating to the first embodiment except that the transmission buffers 2002 and 2003 replace the transmission buffer 306; the cell distributing unit 2004 and cell selecting unit 2005 are newly constructed; and a cell transmission judging unit 3001 replaces the cell transmission judging unit 304. The transmission buffers 2002 and 2003, cell distributing unit 2004, and the cell selecting unit 2005 are the same as those relating to the third embodiment to hold data destined for a user device and a network device separately.

Figures 31, 32:
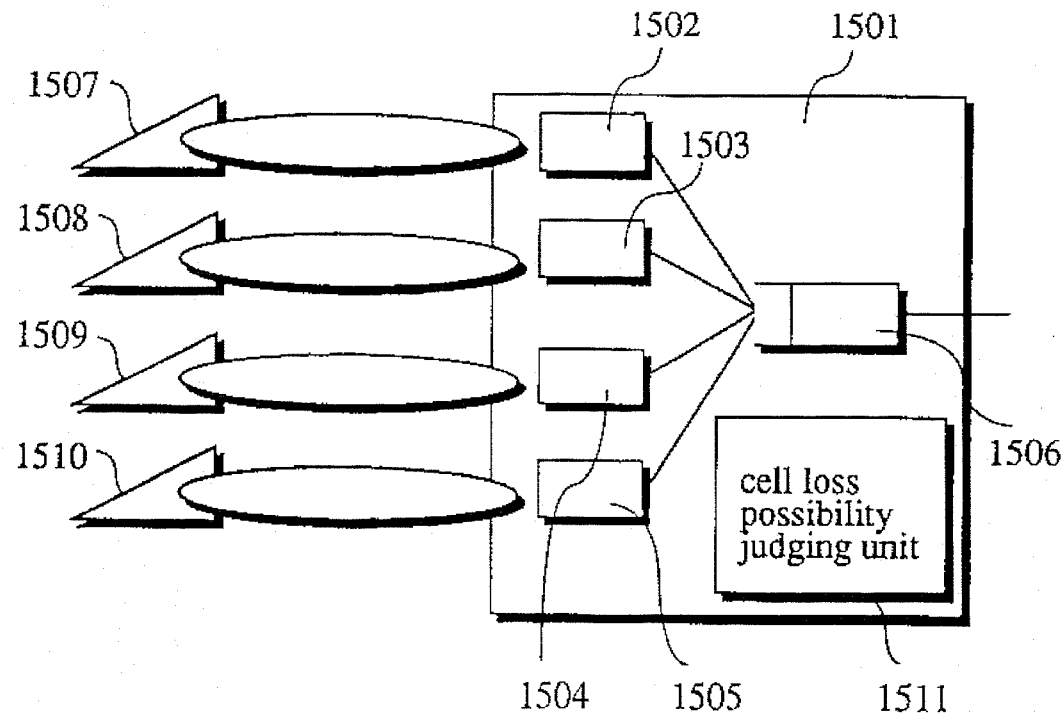
FIG. 31 shows transition between states of a cell by a cell transmission judging unit 3001.
FIG. 32 shows an exemplary system including a plurality of input ports and a line concentrator for concentrating traffic from the plurality of input ports into one communication line.

The cell transmission judging unit 3001 is the same as the one relating to the first embodiment except for the followings. As shown in FIG. 31 for transition between states of a cell, when S=ON, the cell transmission judging unit 3001 transmits a cell carrying data from either the transmission buffer 2002 or the transmission buffer 2003 according to a predetermined order. When S=OFF, on the other hand, it transmits a cell carrying only data destined for another user device. Accordingly, transmission of cells to a network device is regulated.

Description of Operation

Usually, a traffic controller of a network device sets S=ON at a rate corresponding to bandwidth of output ports.

Accordingly, the total number of cells flowing to all input ports of the network device correspond to bandwidth of all output ports. When one of output buffers is likely to overflow, a traffic controller which generates this overflow state transmits a cell with S=OFF. A user device cannot transmit event an available cell destined for the network device after receiving a cell with S=OFF. Consequently, overflow state of the network device is solved in time.

Thus, according to flow control relevant for this embodiment, a traffic controller of a network device can control cells flowing from a user device to itself by setting S=ON at an appropriate rate. Under regulation, the bandwidth adjusting unit 2901 in this embodiment sets S=OFF for every cell; however, S=OFF can be set changing rates by stages depending on the number of data in an output buffer.

Also, a reset cell transmission cycle (initial value for the timer 403) can be changed in association with a rate by the bandwidth judging unit 2901. Clearly, overflow state can be solved in greater detail.

Flow control of the present invention can be applied not only to a network device including an N×N switch but also to a line concentrator. FIG. 32 shows a system example where flow control is applied to a line concentrator for concentrating traffics from a plurality of input ports into one communication path. The system in FIG. 32 includes a line concentrator 1501, traffic controllers 1502–1505 to which reception buffers are added, an output buffer 1506, user devices 1507–1510, and a cell loss possibility judging unit 1511. These components are the same as the components labeled likewise in FIG. 1. The cell loss possibility judging unit 1511 monitors overflow state for reception buffers included in the traffic controllers 1502–1505.

Flow control can also applied to a system where traffic controllers 1502–1505 do not include reception buffers, and cells from user devices 1507–1510 are directly stored in the transmission buffer 1506. In this case, the cell loss possibility judging unit 1511 monitors overflow state for the transmission buffer 1506.

Although in the first embodiment, a reset is directed only by a traffic controller, a reset can be directed by a user device as well. In this case, when receiving a regulation notice from the cell loss possibility judging unit 120, a traffic controller does not direct a reset even when reset is ready, nor provides a user device with a reset direction.

Flow control can be applied not only to a communication path made up of single traffic but also to a communication path made up of a plurality of traffic. For example, traffic are classified into a plurality of quality levels (priority level and non-priority level), and bandwidth which assures a peak speed is assigned to traffic at priority level, while the remaining part of the bandwidth is assigned to non-priority level. Flow control in the present invention can be applied to such system.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A flow control device constructed at a switch device for connecting a plurality of ring networks, which convey a cell carrying data, and for exchanging data of a cell among the plurality of ring networks, a user device is connected to each ring network for loading data on a cell and transmitting up to a window counter's counting number of cells, the window counter indicating the maximum number of cells available for the transmission of data, such flow control device comprising:

a buffer monitoring means for monitoring the number of data in one of a plurality of buffers, the plurality of buffers corresponding to the plurality of ring networks one to one, such that each ring network has an associated buffer;

a regulation judging means for comparing the number of data in each buffer with a first threshold value and with a second threshold value, and for outputting a regulation notice by which data flowing to each buffer is regulated when the number of data is greater than the first threshold value while outputting a release notice by which the regulation notice is released when the number of data is smaller than the second threshold value; and a plurality of traffic controlling means corresponding to the plurality of ring networks one to one such that each traffic controlling means has an associated ring network and an associated buffer, each traffic controlling means receiving the regulation notice relating to its associated buffer and transmitting to its associated ring network a reset cell by which the window counter of a user device is reset to an initial value at a first interval when the traffic controlling means does not receive the regulation notice relating to its associated buffer, and transmitting to its associated ring network the reset cell at a second interval which is longer than the first interval when it receives the regulation notice relating to its associated buffer, wherein each user device resets the window counter to the initial value upon reception of the reset cell.

2. The flow control device of claim 1, wherein the plurality of buffers comprise a plurality of input buffers for storing the cell data received from each ring network or a plurality of output buffers for storing the cell data exchanged by the switch device.

3. The flow control device of claim 2, wherein the first threshold value is set to a predetermined value which is smaller than a maximum capacity of each buffer; and the second threshold value is set to a value less than the first threshold value to assure a sufficient remaining capacity in each buffer such that there is no danger of an overflow.

4. The flow control device of claim 3, wherein the predetermined value is obtained by subtracting the product of V and T from a value greater than or equal to $W_{total}$; $W_{total}$ is the sum total of transmissible cell numbers of each user device, a transmissible cell number is a maximum number of cells which each user device can transmit to the switch device; V is the speed at which cells in the buffer are reduced; and T is the shortest time required for the buffer to transmit $W_{total}$ number of cells.

5. The flow control device of claim 1, wherein the first interval is set to assure that use of cells is fair to each user device, and the second interval is set to prevent overflow.

6. The flow control device of claim 5, wherein each cell includes a reset flag which directs the user device to reset the window counter, and the traffic controlling means comprises:

a reset controlling means for providing a first initial value corresponding to the first interval when the regulation notice is not outputted from the regulation judging means or the release notice is outputted, and for providing a second initial value corresponding to the second interval when the regulation notice is outputted;

a timer for generating a time-out when the counter has counted from either the first or second initial value to 0, the timer resetting to an initial value and restarting to count upon each transmission of the reset cell; and a flag setting means for setting the reset flag included in each cell upon each time-out by the timer, wherein the first and second intervals are timed by the timer which starts either from the first initial value or the second initial value respectively, depending on the value provided by the reset controlling means, and times out periodically.

7. The flow control device of claim 6, wherein each cell includes regulation information which directs whether cells destined for the switch device should be regulated; and the flag setting means sets the reset flag, and sets the regulation information to direct regulation simultaneously.

8. The flow control device of claim 6, wherein the reset controlling means decreases the second initial value by stages and provides the decreased second initial value to the timer.

9. The flow control device of claim 6, wherein the reset controlling means prohibits counting by the timer when the regulation notice is outputted.

10. The flow control device of claim 6, wherein each cell further includes a regulation flag which prohibits transmission of cells from the user device to the switch device; and the flag setting means sets the regulation flag only when the regulation notice is outputted.

11. The flow control device of claim 5, wherein the cell includes a reset flag directing a reset and a reset confirmation flag confirming that the window counter of the user device is 0 or the user device has no data to be transmitted, and the flow control device further comprises:

a reset controlling means for, when no regulation notice is outputted or the release notice is outputted, outputting a reset flag set direction if the reset confirmation flag included in the cell received from the network is set; and a flag setting means for setting the reset confirmation flag, included in every cell received from the ring network, before transmitting the cell, and setting the reset flag when the reset flag setting direction is received, wherein each user device does not change the reset confirmation flag included in the cell when its window counter is 0 or it has no data to be transmitted; each user device resets the reset confirmation flag included in the cell when its window counter is other than 0 and it has data to be transmitted; and each user device resets its window counter to the initial value upon reception of the cell whose reset flag is set.

12. The flow control device of claim 5, wherein each cell includes a reset flag which directs the user device to reset the window counter and a reset confirmation flag which confirms that the window counter of the user device is 0 or the user device has no data to be transmitted, and the traffic controlling means comprises:

a timer for generating a time-out when it has counted from either a first or second initial value to 0, the timer resetting to one of the initial values and re-starting to count upon each transmission of the reset cell;

a reset controlling means for providing the timer with a first initial value which corresponds to the first interval when no regulation notice is outputted from the regulation judging means or the release notice is outputted, further outputting the reset flag set direction when the reset confirmation flag included in the cell received from the network is set, and for providing the timer with a second initial value which corresponds to the second interval when the regulation notice is outputted; and a flag setting means for setting the reset confirmation flag of every cell received from the ring network before transmitting the cell, for setting the reset flag when the reset flag setting direction is received, and for setting the reset flag included in each cell upon each time-out by the timer, wherein each user device does not change the reset confirmation flag included in the cell when its window counter is 0 or it has no data to be transmitted; each user device resets the reset confirmation flag included in the cell when its window counter is other than 0 and it has data to be transmitted; and each user device resets its window counter upon reception of the cell whose reset flag is set, whereby the first and second intervals are timed by the timer which starts from the first initial value and the second initial value respectively and times out periodically.

13. The flow control device of claim 12, wherein the reset controlling means decreases the second initial value by stages, and provides the decreased second initial value to the timer.

14. The flow control device of claim 13, wherein the reset controlling means prohibits counting by the timer when the regulation notice is outputted.

15. The flow control device of claim 1, wherein the regulation judging means comprises:

a buffer monitoring unit for monitoring if the number of data in each buffer is greater than the first threshold value, and monitoring if the number of data is smaller than the second threshold value;

a regulation notice unit for issuing the regulation notice to the traffic controlling means relating to a buffer when the number of data in the buffer is greater than the first threshold value;

a release notice unit for issuing the release notice to the traffic controlling means relating to the buffer if the number of data in the buffer is smaller than the second threshold value and the regulation notice due to another buffer is not issued to the traffic controlling means; and a notice storing unit for storing a set of the regulation notice issued by the regulation notice unit, a buffer number which causes the regulation notice, and a traffic controlling means' number to which the regulation notice is issued, wherein the regulation notice unit stores the buffer number and the traffic controlling means' number upon each issue of the regulation notice, and the release notice unit determines if the release notice should be issued as referring to the notice storing unit, and erases a corresponding part of the notice storing unit upon each issue of the release notice.

16. The flow control device of claim 15, wherein the plurality of buffers are a plurality of output buffers each for storing cells to be transmitted to each ring network after being exchanged by the switch device;

the regulation notice unit issues the regulation notice to every traffic controlling means which writes cell data into the output buffer whose data number is greater than the first threshold value; and the release notice unit issues the release notice to the traffic controlling means to which no regulation notice due to another output buffer is issued and the output buffer of which stores the number of data which is smaller than the second threshold value from the traffic controlling means to which the regulation notice is issued.

17. The flow control device of claim 15, wherein the buffer monitoring means comprises:

a first register for storing the first threshold value;

a second register for storing the second threshold value;

a counter which increments its counting number by 1 upon each write-in of data into the buffer, and decrements its counting number by 1 upon each read-out of data from the buffer, whereby the number of data in the buffer is recorded;

a first comparing unit for comparing the first threshold value with the counter's counting number to judge if the counting number is greater than the first threshold value; and a second comparing unit for comparing the second threshold value with the counter's counting number to judge if the counting number is smaller than the second threshold value.

18. A flow control device constructed at a user device connected to a ring network, which conveys a cell carrying data, the user device communicates by loading data on the cell and transmitting up to a window counter's counting number of cells, the window counter indicating a maximum number of cells available to the user device for data transmission; a management device for managing cells in the ring network transmits a reset cell directing the user device to reset the window counter; the user device comprises a first transmission buffer for storing cell data to be transmitted, a second transmission buffer for storing another cell data to be transmitted, and a reception buffer for storing cell data received from the ring network; and the cell includes reset information indicating if the window counter should be reset and first prohibition information indicating if transmission of cell data from the first transmission buffer should be regulated, such flow control device comprising:

a prohibition information storing means for storing the first prohibition information included in the received cell when the received cell's reset information directs reset; and a cell transmission judging means for prohibiting transmission of cell data from the first transmission buffer when the first prohibition information in the prohibition information storing means directs to prohibit transmission of cell data from the first transmission buffer.

19. The flow control device of claim 18 wherein the first transmission buffer stores cell data destined for the management device linked to the ring network.

20. A flow control device constructed at a user device which is connected to a ring network, which conveys a cell carrying data, the user device communicates by transmitting up to a window counter's counting number of cells carrying data, the window counter indicating a maximum number of cells available for data transmission; each user device resets the window counter according to a cell for directing reset transmitted from a management device for managing cells in the ring network; each user device comprises a first transmission buffer for storing cell data to be transmitted, a second transmission buffer for storing another cell data to be transmitted, and a reception buffer for storing cell data received from the ring network and destined for the user device itself; and the cell includes reset information indicating if the window counter should be reset, first prohibition information indicating if transmission of cell data from the first transmission buffer should be prohibited, and second prohibition information indicating if transmission of cell data from the second transmission buffer should be prohibited, such flow control device comprising:

a buffer monitoring means for monitoring the number of data stored in the reception buffer of the user device;

a regulation judging means for comparing the number of data in the reception buffer with a first threshold value representing a state of the reception buffer which is in danger of overflowing, and outputting a regulation notice by which data flowing to the reception buffer is regulated when the number of data is greater than the first threshold value while outputting a release notice by which the regulation notice is released when the number of data is smaller than the second threshold value;

a prohibition information setting means for positively confirming the second prohibition information when the regulation judging means outputs the regulation notice and the reset information included in a received cell directs reset;

a prohibition information storing means for storing the first and second prohibition information included in the received cell when the the received cell's reset information directs reset; and a cell transmission judging means for prohibiting transmission of cell data from the first and second transmission buffers in accordance with the first and second prohibition information stored in the prohibition information storing means respectively.

21. The flow control device of claim 20 wherein the first transmission buffer stores cell data destined for the management device linked to the ring network; and the second transmission buffer stores cell data destined for another user device linked to the ring network.

22. The flow control device of claim 20, wherein the first transmission buffer holds priority data and the second transmission buffer holds non-priority data.

23. A flow control device constructed at a line concentrator for connecting a plurality of ring networks, which convey a cell carrying data, and concentrating cell data from the plurality of ring networks; a user device is connected to each ring network for loading data on the cell and transmitting up to a window counter's counting number of cells, the window counter indicating a maximum number of cells available for transmission of data, such flow control device comprising:

a buffer monitoring means for monitoring the number of data in one of a plurality of transmission buffers in the line concentrator;

a regulation judging means for comparing the number of data in each buffer with a first threshold value representing a state of the buffer which is in danger of overflowing, with a second threshold value representing a state of the buffer which is not in danger of overflowing, and outputting a regulation notice by which data flowing to the buffer is regulated when the number of data is greater than the first threshold value while outputting a release notice by which the regulation notice is released when the number of data is smaller than the second threshold value;

a plurality of traffic controlling means corresponding to input ports of the line concentrator one to one, the line concentrator inputting cell data from the plurality of ring networks such that each traffic controlling means has an associated input port and ring network, each traffic controlling means transmitting to its associated ring network a reset cell by which the window counter of a user device is reset to an initial value at a first interval when the traffic controlling means does not receive the regulation notice relating to the respective buffer, and transmitting to the respective ring network the reset cell at a second interval which is longer than the first interval when it receives the regulation notice relating to the respective buffer, wherein each user device resets the window counter to the initial value upon reception of the reset cell.

24. The flow device of claim 23, wherein the plurality of buffers include a plurality of input buffers for storing cell data received from each ring network or a plurality of output buffers for storing cell data concentrated by the line concentrator.

25. The flow control device of claim 24, wherein the first threshold value is set to a predetermined value which is smaller than a maximum capacity of each buffer; and the second threshold value is set to a value less than the first threshold value to assure a sufficient remaining capacity in each buffer such that there is no danger of a buffer overflow.

26. The flow control device of claim 25, wherein the predetermined value is obtained by subtracting the product of V and T from a value greater than or equal to $W_{total}$; $W_{total}$ is the sum total of transmissible cell numbers of each user device; a transmissible cell number is a maximum number of cells which each user device can transmit; V is the speed at which cells in the buffer are reduced; and T is the shortest time required for the buffer to transmit $W_{total}$ number of cells.

27. The flow control device of claim 23, wherein the first interval is set to assure that use of cells is fair to each user device, and the second interval is set to prevent overflow.

28. The flow control device of claim 27, wherein each cell includes a reset flag which directs the user device to reset the window counter, and the traffic controlling means comprises:

a reset controlling means for providing a first initial value corresponding to the first interval when the regulation notice is not outputted from the regulation judging means or the release notice is outputted, and for providing a second initial value corresponding to the second interval when the regulation notice is outputted;

a timer for generating a time-out when the counter has counted from either the first or second initial value to 0, the timer resetting to an initial value and re-starting to count upon each transmission of the reset cell; and a flag setting means for setting the reset flag included in each cell upon each time-out by the timer, wherein the first and second intervals are timed by the timer which starts either from the first initial value or the second initial value, respectively, depending on the value provided by the reset controlling means, and times out periodically.

29. The flow control device of claim 28, wherein each cell includes regulation information which directs whether cells destined for the line concentrator should be regulated; and the flag setting means sets the reset flag, and sets the regulation information to direct regulation simultaneously.

30. The flow control device of claim 28, wherein the reset controlling means decreases the second initial value by stages and provides the decreased second initial value to the timer.

31. The flow control device of claim 28, wherein the reset controlling means prohibits counting by the timer when the regulation notice is outputted.

32. The flow control device of claim 28, wherein each cell further includes a regulation flag which prohibits transmission of cells from the user device to the line concentrator; and the flag setting means sets the regulation flag only when the regulation notice is outputted, wherein the user device transmits a cell destined for another user device when the regulation flag of the cell is set.

33. The flow control device of claim 27, wherein the cell includes a reset flag directing a reset and a reset confirmation flag confirming that the window counter of the user device is 0 and the user device has no data to be transmitted, and the flow control device further comprises:

a reset controlling means for, when no regulation notice is outputted or the release notice is outputted, outputting a reset flag set direction if the reset confirmation flag included in the cell received from the network is set; and a flag setting means for setting the reset confirmation flag included in every cell received from the ring network before transmitting the cell, and setting the reset flag when the reset flag setting direction is received, wherein each user device does not change the reset confirmation flag included in the cell when each user device's window counter is 0 or when each user device has no data to be transmitted; each user device resets the reset confirmation flag included in the cell when its window counter is other than 0 and it has data to be transmitted; and each user device resets its window counter to the initial value upon reception of the cell whose reset flag is set.

34. The flow control device of claim 27, wherein each cell includes a reset flag which directs the user device to reset the window counter and a reset confirmation flag which confirms that the window counter of the user device is 0 or the user device has no data to be transmitted, and the traffic controlling means comprises:

a timer for generating a time-out when it has counted from either a first or second initial value to 0, the timer resetting to one of the initial values and re-starting to count upon each transmission of the reset cell;

a reset controlling means for providing the timer with a first initial value which corresponds to the first interval when no regulation notice is outputted from the regulation judging means or the release notice is outputted, further outputting the reset flag set direction when the reset confirmation flag included in the cell received from the network is reset, and for providing the timer with a second initial value which corresponds to the second interval when the regulation notice is outputted; and a flag setting means for setting the reset confirmation flag of every cell received from the ring network before transmitting the cell, for setting the reset flag when the reset flag setting direction is received, and for setting the reset flag included in each cell upon each time-out by the timer, wherein each user device does not change the reset confirmation flag included in the cell when its window counter is 0 or it has no data to be transmitted; each user device resets the reset confirmation flag included in the cell when its window counter is other than 0 and it has data to be transmitted; and each user device resets its window counter upon reception of the cell whose reset flag is set, whereby the first and second intervals are timed by the timer which starts from the first initial value and the second initial value respectively and times out periodically.

35. The flow control device of claim 34, wherein the reset controlling means decreases the second initial value by stages, and provides the decreased second initial value to the timer.

36. The flow control device of claim 35, wherein the reset controlling means prohibits counting by the timer when the regulation notice is outputted.

37. The flow control device of claim 23, wherein the regulation judging means comprises:

a buffer monitoring unit for monitoring if the number of data in each buffer is greater than the first threshold value, and monitoring if the number of data in each buffer is smaller than the second threshold value;

a regulation notice unit for issuing the regulation notice to the traffic controlling means relating to the buffer when the number of data in the buffer is greater than the first threshold value;

a release notice unit for issuing the release notice to the traffic controlling means relating to the buffer if the number of data in the buffer is smaller than the second threshold value and the regulation notice due to another buffer is not issued to the traffic controlling means; and a notice storing unit for storing a set of the regulation notices issued by the regulation notice unit, a buffer number which causes the regulation notice, and a traffic controlling means' number to which the regulation notice is issued, wherein the regulation notice unit stores the buffer number and the traffic controlling means' number upon each issue of the regulation notice, and the release notice unit determines if the release notice should be issued as referring to the notice storing unit, and erases a corresponding part of the notice storing unit upon each issue of the release notice.

38. The flow control device of claim 37, wherein the plurality of buffers are a plurality of output buffers each for storing cells to be transmitted to each ring network after being concentrated by the line concentrator;

the regulation notice unit issues the regulation notice to every traffic controlling means which writes cell data into the output buffer whose data number is greater than the first threshold value; and the release notice unit issues the release notice to the traffic controlling means which have not been issued a regulation notice by another output buffer, and the output buffer whose number of data is smaller than the second threshold value.

39. The flow control device of claim 37, wherein the buffer monitoring means comprises:

a first register for storing the first threshold value;

a second register for storing the second threshold value;

a counter which increments its counting number by 1 upon each write-in of data into the buffer, and decrements its counting number by 1 upon each read-out of data from the buffer, whereby the number of data in the buffer is recorded;

a first comparing unit for comparing the first threshold value with the counting number of the counter to judge if the counting number is greater than the first threshold value; and a second comparing unit for comparing the second threshold value with the counting number of the counter to judge if the counting number is smaller than the second threshold value.

40. A network system for connecting a plurality of terminals to a ring transmission path on which a plurality of fixed-length cells circulate, for storing an address of a terminal to which each cell is destined in a header part of the cell while storing cell data in a payload part of the cell, and for transferring the information from a source terminal to a destination terminal asynchronously, the header part of each cell comprising an identification information area which indicates if the source terminal is available for a cell destined for the destination terminal, the destination terminal comprising:

a reception buffer which is capable of storing cell data in a plurality of cells destined for the destination terminal selected from all the cells received via the transmission path;

a cell loss possibility judging unit for judging if the reception buffer is likely to abandon a cell; and a bandwidth adjusting unit for modifying the identification information area included in the header part of a cell to be transmitted to the transmission path in accordance with a judging result from the cell loss possibility judging unit so that cell abandonment of the reception buffer is prevented, whereby a bandwidth amount of an available cell on the transmission path destined for the destination terminal is adjusted, and the source terminal comprising:

a transmission cell managing unit for detecting if the identification information area of a cell received via the transmission path indicates that the cell is available as a cell destined for the destination terminal; and a first cell transmitting unit for loading cell data to be transferred to the destination terminal onto the payload part of a cell only when the transmission cell managing unit detects that the cell is available as a cell destined for the destination terminal.

41. The network system of claim 40, wherein the destination terminal further comprises a flowable bandwidth amount managing unit for holding a predetermined bandwidth amount of a cell on the transmission path which is available as a cell destined for the destination terminal when the cell loss possibility judging unit judges that the reception buffer is not likely to abandon a cell; and when the cell loss possibility judging unit judges that the reception buffer is not likely to abandon a cell, the identification information area for a cell corresponding to the bandwidth amount held by the flowable bandwidth amount managing unit is written into a cell which is available as a cell destined for the destination terminal.

42. The network system of claim 41, wherein the cell loss possibility judging unit sets a regulation threshold value for a buffer length of a cell stored in the reception buffer, and judges that the reception buffer is likely to abandon a cell when the number of cell data within the reception buffer becomes greater than the regulation threshold value.

43. The network system of claim 42, wherein the cell loss possibility judging unit sets a regulation release threshold value which is smaller than the regulation threshold value for the buffer length of a cell stored in the reception buffer, and judges that the reception buffer is not likely to abandon a cell when the number of cell data within the reception buffer changes from the regulation threshold value to a value smaller than the regulation release threshold value.

44. The network system of claim 40, wherein the source terminal comprises a second cell transmitting unit for loading information to be transferred to another terminal into the payload part of a cell when the transmission cell managing unit detects that the cell is available as a cell destined for the destination terminal; and when the transmission cell managing unit detects that the identification information area of a cell received via the transmission path is available as a cell destined for the destination terminal, the transmission cell managing unit provides the first cell transmitting unit with an operation priority over the second cell transmitting unit.

45. The network system of claim 44, wherein the destination terminal further comprises a flowable bandwidth amount managing unit for holding a predetermined bandwidth amount of a cell on the transmission path which is available as a cell destined for the destination terminal when the cell loss possibility judging unit judges that the reception buffer is not likely to abandon a cell; and when the cell loss possibility judging unit judges that the reception buffer is not likely to abandon a cell, the identification information for a cell corresponding to the bandwidth amount held by the flowable bandwidth amount managing unit is written into a cell which is available as a cell destined for the destination terminal.

46. The network system of claim 45, wherein the cell loss possibility judging unit sets a regulation threshold value for buffer length of a cell stored in the reception buffer, and judges that the reception the buffer is likely to abandon a cell when the number of cell data within the reception buffer becomes greater than the regulation threshold value.

47. The network system of claim 46, wherein the cell loss possibility judging unit sets a regulation release threshold value which is smaller than the regulation threshold value for buffer length of a cell stored in the reception buffer, and judges that the reception buffer is not likely to abandon a cell when the number of cell data within the reception buffer changes from the regulation threshold value to a value smaller than the regulation release threshold value.

\* \* \* \* \*